United States Patent [19]
Suzuki et al.

[11] 3,872,093
[45] Mar. 18, 1975

[54] NAPHTHISOXAZOLYL ALKANOIC ACIDS AND THEIR DERIVATIVES

[75] Inventors: Yasushi Suzuki, Yokohama; Toshihisa Itaya; Nobuyoshi Minami, both of Kawasaki; Masaaki Tarutani; Tokutaro Miki, both of Tokyo; Katsuhiko Myasaka, Kawasaki, all of Japan

[73] Assignee: Teikoku Hormone Mfg. Co., Ltd., Tokyo, Japan

[22] Filed: Feb. 2, 1972

[21] Appl. No.: 223,009

Related U.S. Application Data

[63] Continuation-in-part of Ser. No. 864,163, Oct. 6, 1969, abandoned.

[30] Foreign Application Priority Data

| Oct. 8, 1968 | Japan | 43-72990 |
| Oct. 8, 1968 | Japan | 43-72991 |
| Apr. 26, 1969 | Japan | 44-32241 |
| Apr. 26, 1969 | Japan | 44-32242 |
| Apr. 26, 1969 | Japan | 44-32243 |

[52] U.S. Cl. ........... 260/307 D, 260/247.2 A, 260/247.2 B, 260/247.5 B, 260/268 TR, 260/293.58, 260/469, 260/473 F, 424/248, 424/250, 424/267, 424/272
[51] Int. Cl. ........... C07d 85/22
[58] Field of Search .. 260/307 D, 247.2 A, 247.2 B, 260/247.5 B, 293.58, 268 TR, 247.5 EP

[56] References Cited
OTHER PUBLICATIONS
Suzuki et al., C. A. 75, 35999h, (1971).

Primary Examiner—Raymond V. Rush
Attorney, Agent, or Firm—Sherman & Shalloway

[57] ABSTRACT

Naphthisoxazolyl alkanoic acids and their derivatives expressed by the general formula

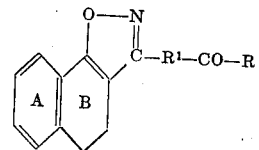

wherein ring A may be optionally substituted, ring B may have a double bond between the positions of C-4 and C-5, $R^1$ represents a methylene group, and R is a hydroxyl group, a group of the formula $-O(M)1/m$ (wherein M is a base having a valence of 1, 2 or 3 and $m$ is the valence of M), an alkoxy group, an amino group, an aminoalkoxy group or an aminoalkyl amino group. These compounds have analgesic, antiinflammatory and antipyretic properties.

15 Claims, No Drawings

NAPHTHISOXAZOLYL ALKANOIC ACIDS AND THEIR DERIVATIVES

This application is a continuation-in-part of application Ser. No. 864,163 filed Oct. 6, 1969 now abandoned.

This invention relates to novel naphthisoxazolyl alkanoic acids and their derivatives. Phenyl substituted isoxazolyl alkanoic acids and their alkyl esters of the formula

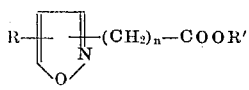

where R is a phenyl group, R' is a hydrogen atom or an alkyl group having not more than five carbon atoms and $n$ is 1 or 2 are known from British Pat. No. 989,772.

The naphthisoxazolyl alkanoic acids and their derivatives of the present invention are expressed by the following general formula

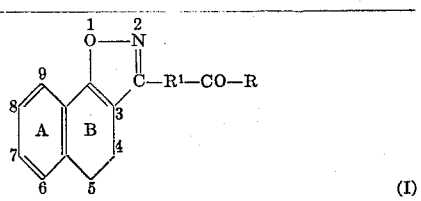

(I)

wherein ring A may be optionally substituted, ring B may have a carbon-to-carbon double bond between the C-4 and C-5 positions, $R^1$ represents a methylene group, and R represents a hydroxyl group, a group of the formula $-O(M)_1/m$ (wherein M is a base having a valence of 1, 2 or 3 and $m$ is the valence of M), an alkoxy group, an amino group, an aminoalkoxy group or an aminoalkyl amino group.

The novel naphthisoxazolyl alkanoic acids and their derivatives expressed by the above general formula (I) have excellent analgesic, antipyretic and anti-inflammatory activities, and are useful as non-steroidal medicines.

In the above general formula (I), ring A may be mono-, di- or tri-substituted with optional substituents; for instance, alkoxy groups such as methoxy, ethoxy, n- or iso-propoxy and n-, iso-, sec- or tert-butoxy, preferably alkoxy groups of 4 or less carbon atoms; alkyl groups such as methyl, ethyl and n- or iso-propyl, preferably alkyl groups of 4 or less carbon atoms; and halogen atoms such as bromine, chlorine, and iodine. Ring B may either be saturated at the position between C-4 and C-5 or have a carbon-to-carbon double bond at such position, and $R^1$ represents a methylene group.

When R in the above general formula (I) is an alkoxy group, it may be methoxy, ethoxy, propoxy, n-, iso- or tert-butoxy, pentyloxy or hexyloxy groups, but an alkoxy group of 1 to 4 carbon atoms is especially preferred. When R in the above general formula (I) is an amino group, it may be one expressed by the formula

wherein $R^5$ and $R^6$ each represent hydrogen or an alkyl group such as methyl, ethyl, propyl, butyl and pentyl, preferably an alkyl group of 4 or less carbon atoms; and alkyl groups $R^5$ and $R^6$ may be bonded together directly or through an oxygen or nitrogen atom to form together directly or through an oxygen or nitrogen atom to form together with the nitrogen atom a 5- or 6- membered heterocyclic ring such as pyrrolidino, piperidino, 4-alkyl piperazino and morpholino.

The group $-O(M)_1/M$ in above general formula (I) means that a base M may be bonded to the carboxyl group while forming a salt therewith. As such base there may be exemplified alkali metals such as sodium, potassium and lithium; alkaline earth metals such as calcium and magnesium; trivalent metals such as aluminum; divalent groups such as [Al(OH)]; an ammonium group ($NH_4$); and a moiety HZ (in which Z is an organic base).

In case M represents a divalent or trivalent base, compounds of general formula (I) will be expressed by the following formula:

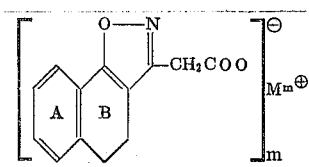

The organic base Z includes organic bases capable of forming salts with organic carboxylic acids, especially proton-receptible, nitrogen-containing compounds. It is preferred that these organic bases are pharmaceutically acceptable, non-toxic organic bases. Especially when organic bases having pharmacological activities such as antibacterial, antiallergic and vitaminic activities are used as the organic base M, pharmacologically very excellent salts can be obtained which possess not only analgestic, antipyretic and anti-inflammatory activities inherent to the naphth [2,1-d] isoxazolyl alkanoic acid but also the activities of such bases, and synergistic effects of these activities can be expected in many cases.

Organic amines are especially preferred as the organic base. Examples of organic amines to be used in this invention are as follows:

1. Aliphatic Amines:
   i. Monoalkyl amines, preferably having up to 4 carbon atoms, such as methyl amine, ethyl amine, propyl amine, iso-propyl amine, butyl amine and the like.
   ii. Alkylene diamines, preferably having up to 4 carbon atoms, such as ethylene diamine, propylene diamine and the like.
   iii. Dialkyl amines, preferably in which each alkyl group has up to 4 carbon atoms, such as dimethyl amine, diethyl amine, di-n-propyl amine, di-iso-propyl amine and the like.
   iv. Trialkyl amines such as trimethyl amine and triethyl amine.
   v. Basic amino acids such as L-arginine.
2. Alicyclic amines, preferably having 5 or 6 carbon atoms in the ring, such as cyclohexyl amine and the like.
3. Heterocyclic amines, namely 5- or 6-membered heterocyclic amines which contain at least one nitrogen atom in the ring and preferably have an oxygen or sulfur atom as the hetero-atom, such as pyrrolidine, piperidine, morpholine, N-alkyl-piperidine and the like.

4. Aromatic amines such as p-aminobenzoyl diethyl amino ethanol and the like.

The above-mentioned organic bases having pharmacological activities include thiamine (vitamin $B_1$), betazole [gastramine; 3-($\beta$-aminoethyl-pyrazole)], lysine, epirephrine, quinine (a kind of alkaloid), cocaine (a kind of alkaloid), oxytetracycline, tetracycline, 1,2-diphenyl-1-dimethyl amino ethane, 2-($\beta$-hydroxyphenethyl amino) pyridine, 1,1-diphenyl-3-N-piperidino-butanol, procaine, etc.

When R in the general formula (I) represents an aminoalkoxy or aminoalkyl amino group, the compounds of this invention are expressed by the following general formula

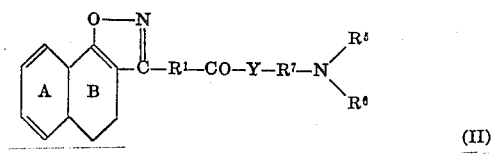

(II)

wherein A, B, $R^1$, $R^5$ and $R^6$ have the same meanings as defined above; $R^7$ is an alkylene group such as methylene, ethylene, ethylidene, 1,2- or 1,3-propylene, propylidene and 1,4-butylene groups, preferably an alkylene group of 4 or less carbon atoms; and Y represents oxygen or a group represented by the formula

wherein $R^8$ is hydrogen or an alkyl group of 4 or less carbon atoms such as methyl, ethyl, propyl or butyl.

For better illustration of the compounds of the above general formual (I), specific examples thereof will be cited below;

1. Naphth [2,1-d] isoxazolyl-3-alkanoic acids of the formula

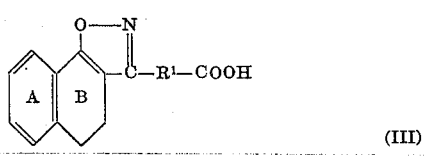

(III)

and salts thereof such as;
4,5-dihydronaphth [2,1-d]isoxazolyl -3-ethanoic acid,
7-methoxy-4,5-dihydronaphth [2,1-d] isoxazolyl-3-ethanoic acid,
8-methoxy-4,5-dihydronaphth [2,1-d]isoxazolyl-3-ethanoic acid,
7,8-dimethoxy-4,5-dihydronaphth [2,1-d] isoxazolyl-3-ethanoic acid,
naphth [2,1-d] isoxazolyl-3-ethanoic acid,
6-chloro-7-methoxy-naphth [2,1-d] isoxazolyl-3-ethanoic acid,
sodium salts, potassium salts, magnesium salts, calcium salts, aluminum salts and ammonium salts of the above-mentioned free acids,
4,5-dihydronaphth [2,1-d] isoxazolyl-3-ethanoic acid diethylamine salt,
4,5-dihydronaphth [2,1-d] isoxazolyl-3-ethanoic acid morpholine salt,
4,5-dihydronaphth [2,1-d] isoxazolyl-3-ethanoic acid L-arginine salt,
4,5-dihydronaphth [2,1-d] isoxazolyl-3-ethanoic acid pyridoxine salt,
4,5-dihydronaphth [2,1-d]isoxazolyl-3-ethanoic acid L-lysine salt,
7-methoxy-4,5-dihydronaphth [2,1-d] isoxazolyl-3-ethanoic acid L-arginine salt,
8-methoxy-4,5-dihydronaphth [2,1-d] isoxazolyl-3-ethanoic acid L-arginine salt,
naphth [2,1-d] isoxazolyl-3-ethanoic acid L-arginine salt,
naphth [2,1-d]isoxazolyl-3-ethanoic acid morpholine salt,
naphth [2,1-d]isoxazolyl-3-ethanoic acid diethylamine salt,
7-methoxy-naphth [2,1-d] isoxazolyl-3-ethanoic acid morpholine salt,
8-methoxy-naphth [2,1-d]isoxazolyl-3-ethanoic acid morpholine salt,
naphth [2,1-d] isoxazolyl-3-ethanoic acid pyridoxine salt,
naphth [2,1-d] isoxazolyl-3-ethanoic acid L-lysine salt,
4,5-dihydronaphth [2,1-d] isoxazolyl-3-ethanoic acid oxophenarsine salt,
naphth [2,1-d]isoxazolyl-3-ethanoic acid ethylene diamine salt, 4,5-dihydronaphth [2,1-d] isoxazolyl-3-ethanoic acid procaine salt,
7-methoxy-naphth [2,1-d]isoxazolyl-3-ethanoic acid ethylene diamine salt,
4,5-dihydronaphth [2,1-d] isoxazolyl-3-ethanoic acid quinine salt,
4,5-dihydronaphth [2,1-d] isoxazolyl-3-ethanoic acid cocaine salt,
4,5-dihydronaphth [2,1-d] isoxazolyl-3-ethanoic acid physostigmine salt,
7-methoxy-4,5-dihydronaphth [2,1-d] isoxazolyl-3-ethanoic acid quinine salt,
7methoxyl-4,5-dihydronaphth [2,1-d] isoxazolyl-3-ethanoic acid cocaine salt, and
4,5-dihydronaphth [2,1-d] sioxazolyl-3-ethanoic acid 2-methyl-1,4-naphthalene diamine salt.

2. Esters of alkanoic acids of the general formula (III) such as:
3-Methoxycarbonylmethyl-4,5-dihydronaphth [2,1-d] isoxazole,
3-Ethoxycarbonylmethyl-4,5-dihydronaphth [2,1-d] isoxazole,
3-tert-Butonycarboxylmethyl-4,5-dihydronaphth [2,1-d] isoxazole,
3-Ethoxycarbonylmethyl-4,5-dihydronaphth [2,1-d] isoxazole,
3-Methoxycarbonylmethyl-4,5-dihydronaphth [2,1-d] isoxazole,
3-Methoxycarbonylmethyl-naphth [2,1-d] isoxazole, and
3-Methoxycarbonylmethyl-6-chloro-7-methoxynaphth [2,1-d] isoxazole.

3. Amides of alkanoic acids of the general formula (III) such as:
3-Carbamoylmethyl-4,5-dihydronaphth [2,1-d]isoxazole,
3-Ethylcarbamoylmethyl-4,5-dihydronaphth [2,1-d] isoxazole, 3-N,N-Diethylcarbamoylmethyl-4,5-dihydronaphth [2,1-d] isoxazole,
3-N,N-Dipropylcarbamoylmethyl-4,5-dihydronaphth [2,1-d] isoxazole,
3-N-Butylcarbamoylmethyl-8-methoxy-4,5-dihydronaphth [2,1-d] isoxazole,
3-N-Morpholino carbamoylmethyl-4,5-dihydronaphth [2,1-d] isoxazole,
3-N-Pyrrolidino carbamoylmethyl-4,5-dihydronaphth [2,1-d] isoxazole,
3-N-Piperidino carbamoylmethyl-4,5-dihydronaphth [2,1-d] isoxazole,
3-N-Piperidino carbamoylmethyl-8-methoxy-4,5-dihydronaphth [2,1-d] isoxazole,
3-Carbamoylmethyl-naphth [2,1-d] isoxazole, and
3-Carbamoylmethyl-6-chloro-7-methoxy-naphth [2,1-d] isoxazole.

4. Compounds expressed by the general formula (III) such as:
3-N,N-Dimethylamino propylcarbamoylmethyl-7-methoxy-4,5-dihydronaphth [2,1-d] isoxazole,
3-N,N-Dimethylaminopropylcarbamoylmethyl-8-methoxy-4,5-dihydronaphth [2,1-d] isoxazole,
3-N,N-Dimethylaminoethylcarbamoylmethyl-4,5-dihydronaphth [2,1-d] isoxazole,
3-N,N-Diethylaminopropyloxycarbonyl-4,5-dihydronaphth [2,1-d] isoxazole, and
3-N,N-Diethylaminoethyloxycarbonylnaphth [2,1-d] isoxazole.

The above mentioned novel compounds of this invention can be synthesized by the methods which will be detailed below.

According to one embodiment of this invention a method is provided of producing compounds of the general formula

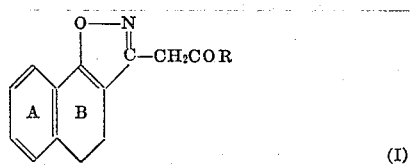

(I)

wherein R represents a hydroxyl group, a group —O(M)$_1$/m (wherein M is a base of a valence of 1, 2 or 3 and $m$ is the valence of M), an alkoxy group, an amino group, an aminoalkoxy group or an aminoalkyl amino group, which comprises reacting a compound of the general formula

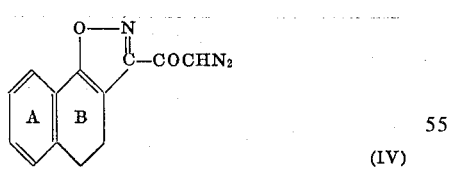

(IV)

wherein ring A may be substituted with substituents having no relation to the reaction and ring B may have a carbon-to-carbon double bond at the position between C-4 and C-5, with an active hydrogen-containing compound selected from the group consisting of water, alcohols, ammonia, primary amines and secondary amines, and optionally converting the resulting free acid to its salt.

As the diazo compounds expressed by the general formula (IV), the following compounds can be cited, for instance, 4,5-dihydronaphth [2,1-d] isoxazolyl-3-diazoketone, 7-methoxy-4,5-dihydronaphth [2,1-d] isoxazolyl-3-diazoketone, 8-methoxy-4,5-dihydronaphth [2,1-d] isoxazolyl-3-diazoketone, 7,8-dimethoxy-4,5-dihydronaphth [2,1-d] 3-diazoketone, naphth [2,1-d] isoxazolyl-3-diazoketone.

As the alcohol there may be cited, for instance, alcohols expressed by the formula $$R^9OH$$

(V)

wherein $R^9$ is an alkyl group, preferably an alkyl group of 4 or less carbon atoms, such as methanol, ethanol, propanol, n-, iso- or tert-butyl alcohol, amylalcohol and hexanol; and amino alcohols expressed by the formula

(VI)

wherein $R^5$ and $R^6$ each represent an alkyl group, preferably an alkyl group of 4 or less carbon atoms, or may be bonded together directly or through an oxygen or nitrogen atom to form together with the nitrogen atom a 5- or 6-membered hetero-cyclic ring such as pyrrolidino, piperidino, 4-alkyl piperizino and morpholino groups, and $R^7$ is an alkylene group, preferably an alkylene group of 4 or less carbon atoms, such as N,N-diethylaminoethyl alcohol, N,N-dimethylaminopropyl alcohol, and N-(3-oxypropyl) morpholine.

Monoamines expressed by the formula

(VII)

wherein $R^5$ is an alkyl group, preferably an alkyl group of 4 or less carbon atoms, $R^6$ is hydrogen or an alkyl group, and the two alkyl groups $R^5$ and $R^6$ may be bonded together directly or through an oxygen or nitrogen atom to form together with the nitrogen atom a 5- or 6-membered heterocyclic ring such as pyrrolidino, piperidino, 4-alkylpiperazino and morpholino groups, may be used such as primary amines, e.g., ethyl amine, propyl amine and butyl amine, and secondary amines, e.g., dimethyl amine, diethyl amine, methyl ethyl amine, dipropyl amine, ethyl butyl amine, pyrrolidine, piperidine, morpholine and 4-ethylpiperazine; and N,N-di-substituted-alkyl amines expressed by the formula

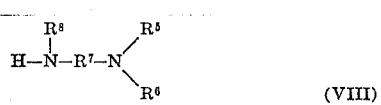

(VIII)

wherein $R^5$ and $R^6$ each represent an alkyl group, preferably an alkyl group of 4 or less carbon atoms, or may be bonded together directly or through an oxygen or nitrogen atom to form together with the nitrogen atom a 5- or 6-membered heterocyclic ring such as pyrrolidino, piperidino, 4-alkylpiperazino and morpholino groups, $R^7$ is an alkylene group, preferably an alkylene group of 4 of less carbon atoms, and $R^8$ is hydrogen or an alkyl group of 4 or less carbon atoms, such as 2-N,N-diethylaminoethyl amine, 3-N,N-dimethylaminopropyl amine, 4-(3-aminoethyl) morpholine and 4-(3-aminopropyl)piperidine.

The reaction of the diazo compound of the formula (IV) with the above mentioned active hydrogen-containing compound has been known as the "Wolff rearrangement," and the reaction can be performed in accordance with known procedures. The reaction temperature is not particularly critical, but generally it is preferable that the reaction is conducted at a temperature ranging from room temperature to the boiling point of the reaction system, especially from 50° to 100°C. It is sufficient that the reaction is carried out under atmospheric pressure, but it is also possible to perform the reaction under either a reduced pressure or a pressure elevated to such an extent as to not cause decomposition of the diazo compound. Although the reaction is allowed to advance even in the absence of a catalyst, in order to accelerate the reaction speed it is preferable to use a silver type catalyst such as silver oxide and silver acetate, or a platinum or copper catalyst. It is possible to carry out the reaction of the diazo compound with the active hydrogen-containing compound by employing an excess of the active hydrogen-containing compound as the reaction medium. It is also possible to use an inert organic solvent having no relation to the reaction such as an aromatic hydrocarbon, e.g., benzene or toluene, an ether, e.g., ethyl ether, tetrahydrofuran or dioxane, or dimethyl formamide and to carry out the reaction of the diazo compound with the active hydrogen-containing compound in such inert organic solvent. When using as easily-volatile reactant such as ammonia or a primary amine, it is especially preferable to use such inert organic solvent.

When the intended products are recovered in the form of salts, the above mentioned compound of the general formula (IV) is reacted with water and the resulting free carboxylic acid of the formula.

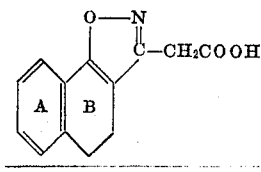

(IX)

is treated with a base to obtain the intended salt. As the base, there may be used, caustic alkali, magnesium hydroxide, calcium hydroxide, aluminum hydroxide, aluminum chloride ammonia, various organic bases expressed by Z defined above, and the like.

Excessive active hydrogen-containing compound and/or organic solvent are removed from the resulting reaction mixture by distillation, and the residue is subjected, if necessary, to recrystallization or chromatography. Thus, the intended product can be isolated in a pure form.

Diazo compounds expressed by the above mentioned general formula (IV) are novel compounds. These novel compounds can be prepared by reacting an acid halide expressed by the formula

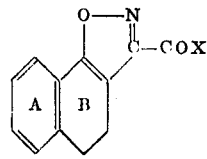

(X)

wherein ring A may be substituted with a substituent such as alkoxy, the ring B may have a carbon-to-carbon double bond at position C-4 and C-5, and X represents a halogen atom, with diazomethane. This reaction has been known as the Arndt-Eistert reaction.

As the acid halide of the formula (X), the following compounds may be cited, for instance, 4,5-dihydronaphth [2,1-d]-isoxazolyl-3-carbonyl chloride, 4,5-dihydronaphth [2,1-d] isoxazolyl-3-carbonyl bromide, 7- or 8-methoxy-4,5-dihydronaphth [2,1-d] isoxazolyl-3-carbonyl chloride, 7- or 8-oxy-4,5-dihydronaphth [2,1-d] isoxazolyl-3-carbonyl chloride, naphth [2,1-d] isoxazole-3-carbonyl chloride, 6-bromo-naphth [2,1-d] isoxazolyl-3-carbonyl bromide, and 6-chloro-7-methoxynaphth [2,1-d] isoxazolyl-3-carbonyl chloride.

The reaction of the acid halide of the above mentioned formula (X) with diazomethane can be conducted in an inert organic solvent by maintaining the reaction system at a temperature ranging from $-10°C$ to room temperature. It is sufficient that the reaction is conducted under atmospheric pressure. The class of the inert organic solvent used is not particularly critical, but the use of an ether such as ethyl ether, tetrahydrofuran and dioxane is particularly preferred. In order to improve the yield of the diazo intermediate product of the above mentioned general formula (IV) it is desired to add to the reaction system an acid binder such as a tertiary amine, e.g., triethyl amine or tripropyl amine, pyridine, quinoline or isoquinoline. However, when placing an excess of diazomethane in the reaction system, an acid binder need not be added. In order to complete the reaction in a short period of time, it is effective to heat a mixture of the above mentioned acid binder and diazomethane at a temperature up to about 50°C. for a short time, for instance, 1 to 10 minutes.

Of acid halides of the above general formula (X), the compounds which are saturated at the position between C-4 and C-5 can be formed from known 1-oxo-1, 2, 3, 4-tetrahydro-2-naphthylglyoxylic acid alkyl esters through the following reaction mechanism.

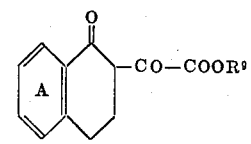

(XI)

↓ NH₂OH

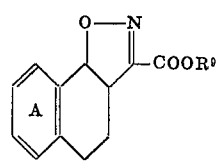

(XII)

↓ hydrolysis (acid or alkali)

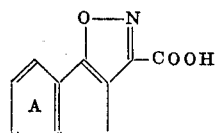

(XIII)

↓ halogenating reagent

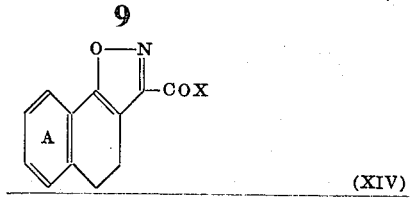

(XIV)

In the above formulas, ring A may have a substituent such as an alkoxy group, $R^9$ is an alkyl group and X is a halogen atom.

The preparation of 4,5-dihydronaphth [2,1-d] isoxazolyl-3-carboxylic acid esters of the formula (XII) from 1-oxo-1, 2, 3, 4-tetrahydro-2-napthylglyoxylic acid alkylesters of the formula (IX) and hydroxylamine, and the preparation of free carboxylic acids of the formula (XIII) from the esters of the formula (XII) may be conducted in accordance with the method proposed in Japanese Publication No. 25656/67 or similar methods.

Acid halides of the formula (XIV) can be prepared by reaction 4,5-dihydronaphth [2,1-d] isoxazolyl-3-carboxylic acids with a known reagent capable of halogenating carboxylic acids under conditions known per se. As the halogenating reagent, phosphorus pentachloride, phosphorus pentabromide, thionyl chloride, thionyl bromide, phosphorus oxychloride, phosphorus oxybromide and the like may be used. As the compound of the general formula (VIII), 4,5-dihydronaphth [2,1-d] isoxazolyl-3-carboxylic acid, 7- or 8-methoxy-4,5-dihydronaphth [2,1-d] isoxazolyl-3-carboxylic acid and 7- or 8-oxy-dihydronaphth [2,1-d] isoxazolyl-3-carboxylic acid may be cited.

The halogenation of the carboxylic acid of the general formula (XIII) may be performed either in the absence of a solvent or in an inert organic solvent, for instance, a halogenated hydrocarbon solvent such as carbon tetrachloride, chloroform and chlorobenzene. The reaction temperature is not particularly critical, but generally temperatures ranging from 50° to 80°C. are preferred.

Of acid halides of the general formula (X), the compounds which have a carbon-to-carbon double bond at the position between C-4 and C-5 of ring B may be prepared either by subjecting acid halides of the formula (XIV) to the cyclo-dehydrogenation treatment, which will be detailed hereinbelow, to form acid halides of the general formula

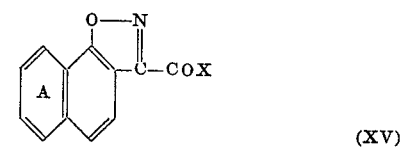

(XV)

or by subjecting esters of the general formula (XII) to similar cyclo-dehydrogenation to form esters of the general formula

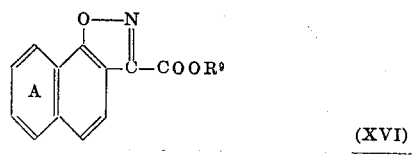

(XVI)

and then subjecting the above esters, through the above mentioned procedures, to hydrolysis with an acid or alkali and the action of a halogenation reagent to thereby form acid halides of the above formula (XV).

In accordance with another embodiment of this invention, a method is provided of producing compounds of the general formula

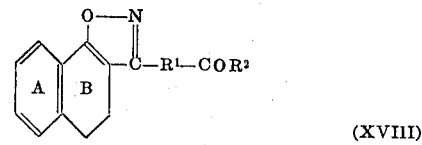

(XVIII)

wherein ring A may be substituted with a substituent having no relation to the reaction and ring B may have a carbon-to-carbon double bond at the position between C-4 and C-5, $R^1$ represents a methylene group, and $R^2$ is a hydroxyl group, an amino group or a group $-O(M)_1/M$ (wherein M is a base of a valence of 1, 2 or 3 and $m$ is the valence of M), which comprises hydrolyzing compounds of the general formula

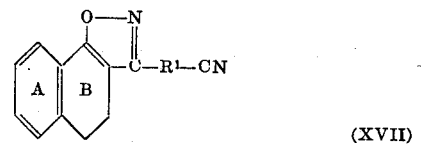

(XVII)

wherein A, B and $R^1$ have the same meanings as defined above, in the presence of a base or an acid.

As specific examples of the compound (XVII), the following compounds may be cited; 3-cyanomethyl-8-methoxy-4,5-dihydronaphth [2,1-d] isoxazole, 3-cyanomethyl-7-methoxy-4,5-dihydronaphth [2,1-d] isoxazole, 3-cyanomethyl-6-ethoxy-4,5-dihydronaphth [2,1-d] isoxazole, 3-cyanomethyl-4,5-dihydronaphth [2,1-d] isoxazole, 3-cyanomethyl 8-ethyl-4,5-dihydronaphth [2,1-d] isoxazole, 3-cyanomethyl-7-ethyl-4,5-dihydronaphth [2,1-d] isoxazole, 3-cyanomethyl-8-methoxynaphth [2,1-d] isoxazole, 3-cyanomethyl-7-methoxynaphth [2,1-d] isoxazole, 3-cyanomethyl-6-ethoxynaphth [2,1-d] isoxazole, 3-cyanomethylnaphth [2,1-d] isoxazole, 3-cyanomethyl-7-methoxy-6-chloronaphth [2,1-d] isoxazole, 3-cyanomethyl-8-methoxy-7-chloronaphth [2,1-d] isoxazole and 3-cyanomethyl-6-bromonaphth [2,1-d] isoxazole.

The hydrolysis of the nitrile compound of the above mentioned general formula (XVII) is generally performed by reacting the same with water. The reaction temperature in this hydrolysis is not particularly critical, but it is generally preferable to carry out the hydrolysis at a temperature ranging from room temperature to the boiling point of the reaction system. The reaction can be carried out at atmospheric pressure and it is possible to perform the hydrolysis reaction under either reduced or elevated pressures.

Although the reaction is allowed to advance even in the absence of a catalyst, in order to accelerate the reaction speed it is possible to use an acid such as a mineral acid, e.g., sulfuric acid, hydrochloric acid or nitric acid, and a cation exchange resin of a sulfonic acid type, or a base such as a caustic alkali, an alkali carbonate and an organic base. It is possible to hydrolyze the compound of the formula (XVII) when suspended in an aqueous medium, but it is preferable to carry out the hydrolysis of the compound of the formula (XVII) by dissolving it in an inert organic solvent having no relation to the reaction, particularly in an alcohol such as methanol, ethanol or propanol, a ketone such as acetone or methyl ethyl ketone, or in a water-miscible organic solvent such as an ether, e.g., ethyl ether or tetrahydrofuran, and blending the solution with water.

In this embodiment of the invention, when the compound of the above general formula (XVII) is reacted only in the presence of water or partially hydrolyzed in the presence of an acid base, an amide of the formula mentioned below is formed.

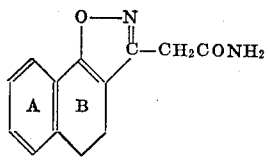

(XIX)

When hydrolyzing the compound of the formula (XVII) completely in the presence of an acid, a free acid of the formula

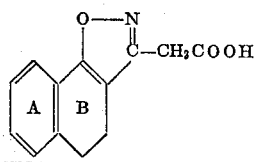

(III)

is obtained. Further, in the case of hydrolyzing the compound of the formula (XVII) completely in the presence of a base, a salt of the formula

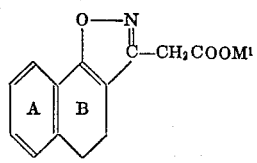

(III')

wherein $M^1$ is the base used, is obtained.

The resulting product can be isolated in a pure form by distilling off the reaction medium used from the reaction mixture or blending the reaction product into a non-solvent, if necessary, followed by recrystallization or chromatography.

The nitrile compound expressed by the general formula (XVII) is a novel compound. This novel compound may be synthesized by reacting a compound of the formula

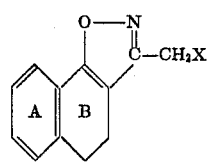

(XX)

wherein ring A may be substituted with a substituent having no relation to the reaction, ring B may have a carbon-to-carbon double bond at the position between C-4 and C-5, and X is a halogen atom, preferably bromine, with an inorganic cyano compound.

As the halide of the formula (XX) the following compounds are cited: for instance, 3-chloromethyl-8-methoxy-4,5-dihydronaphth [2,1-d] isoxazole, 3-chloromethyl-7-methoxy-4,5-dihydronaphth [2,1-d] isoxazole, 3-chloromethyl-6-ethoxy-4,5-dihydronaphth [2,1-d] isoxazole, 3-bromomethyl-8-methoxy-4,5-dihydronaphth [2,1-d] isoxazole, 3-bromomethyl-7-methoxy-4,5-dihydronaphth [2,1-d] isoxazole, 3-bromomethyl-6-ethoxy-4,5-dihydronaphth [2,1-d] isoxazole, 3-bromomethyl-8-ethyl-4,5-dihydronaphth [2,1-d] isoxazole, 3-bromomethyl-7-ethyl-4,5-dihydronaphth [2,1-d] isoxazole, 3-chloromethyl-4,5-dihydronaphth [2,1-d] isoxazole, 3-bromomethyl-4,5-dihydronaphth [2,1-d] isoxazole, 3-chloromethyl-8-methoxynaphth [2,1-d] isoxazole, 3-chloromethyl-8-methoxy-7-chloronaphth [2,1-d] isoxazole, 3-chloromethyl-7-methoxynaphth [2,1-d] isoxazole, 3-chloromethyl-8-methoxy- 7-chloronaphth [2,1-d] isoxazole, 3-chloromethyl-7-methoxynaphth [2,1-d] isoxazole, 3-chloromethyl-7-methoxy-6-chloronaphth [2,1-d] isoxazole, 3-bromomethylnaphth [2,1-d] isoxazole, 3-bromomethyl-8-methoxynaphth [2,1-d] isoxazole and 3-bromomethyl-7-methoxynaphth [2,1-d] isoxazole.

Any inorganic cyano compound that is generally known to react with an alkyl halide can be used as the inorganic cyano compound. For instance, inorganic cyano compounds of the formula $$M^3(CN)n$$

(XXI)

wherein $M^3$ is (a) a metal (such as an alkali metal, e.g., sodium, potassium or lithium, an alkaline earth metal, e.g., calcium, magnesium or barium, and silver, copper, mercury, zinc or lead) (b) ammonium, (c) hydrogen or (d) a cyano group, and $n$ is the valence of $M^3$, may be preferably used.

The reaction between the halide of the formula (XX) and the inorganic cyano compound can be performed under conditions known per se. For instance, this cyanogenation reaction may be conducted in the presence of a polar substance at a temperature ranging from room temperature to the boiling point of the reaction system, preferably from 50° to 150°C. The reaction may be performed sufficiently under atmospheric pressure, but of course, it is possible to carry out the reaction under either reduced or elevated pressures. As the polar substance water; lower alcohols such as methanol and ethanol; carboxylic acids such as formic acid, oxalic acid and acetic acid; ethers such as tetrahydrofuran and ethyl ether; halogenated aliphatic hydrocarbons such as chloroform and dichloroethane; N,N-disubstituted acylamides such as dimethyl formamide, diethyl formamide and dimethyl acetamide; and disubstituted sulfoxides such as dimethyl sulfoxide may be used. These polar substances may be used in the state added to an organic solvent which is non-polar by itself.

In a preferable embodiment of the invention, the cyano group containing compound of the above mentioned formula (XVII) is formed and then subjected to the hydrolysis after or without the isolation of the compound of the formula (XVII). Further, the cyanogenation of the halide of the above formula (XX) and the hydrolysis of the cyano group may be performed coincidentally be conducting the cyanogenation in the presence of water. The latter method is advantageous in that the introduction of the cyano group and the hydrolysis of the cyano group can be performed coincidentally in a single step and the introduction of the cyano group can be easily achieved.

The halides of the above mentioned general formula (XX) are prepared from 3-alkoxycarbonylnaphth [2,1-d] isoxazoles and their homologues obtained by reacting a known 1-oxo-1, 2, 3, 4-tetrahydro-2-naphthylglyoxylic acid alkyl ester with a hydroxyl amine, if necessary, followed by the cyclodehydrogenation, through the reactions expressed by the following mechanism

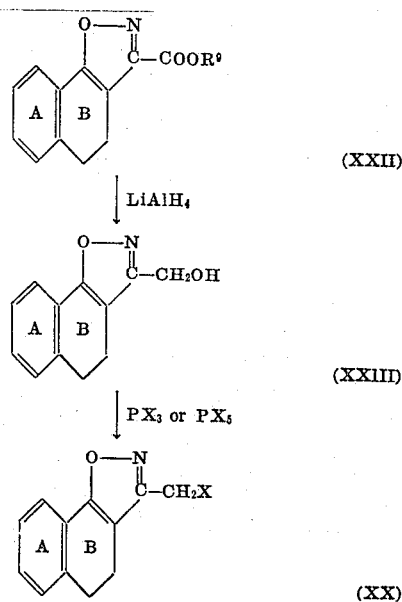

wherein ring A may be substituted with optional substituents, ring B may have a carbon-to-carbon double bond at the position between C-4 and C-5, $R^9$ represents an alkyl group and X is a halogen atom.

The preparation of 4,5-dihydronaphth [2,1-d] isoxazole-3-carboxylic acid esters of the formula (XXII) from 1-oxo-1, 2, 3, 4-tetrahydro-2-naphthylglyoxylic acid alkyl esters and hydroxyl amines, and the preparation of hydroxymethyl products of the formula (XXIII) and halomethyl products of the formula (XX) from esters of the formula (XXII) are conducted in accordance with methods proposed in Japanese publication No. 25656/67 and "the Publication Report of the 89th annual meeting of the Japanese Pharmaceutical Society, P 279 (1969)" or similar methods.

More specifically, the reduction of esters of the formula (XXII) can be performed by employing a metal hydride such as an alkali metal aluminum hydride, e.g., $LiAlH_4$, and an alkali metal boron hydride, e.g., $NaBH_4$; a hydrogenated metal complex such as sodium dihyro-bis (2-methoxyethoxy) aluminate [$H_2NaAl(OCH_2CH_2OCH_3)_2$]; or a combination of an alcohol with an alkali or alkaline earth metal. Further, for instance, a combination of a mineral acid such as hydrochloric acid with a metal such as zinc may be used. Of course, the reducing agent to be used in this invention should not be one which will reduce the isoxazole ring.

The reduction of the compound of the formula (XXII) can be performed by dissolving or suspending the compound into an organic solvent having no relation to the reaction, for instance, an ether such as tetrahydrofuran and ethyl ether; an aromatic hydrocarbon such as benzene, toluene and xylene; an alcohol such as methanol, ethanol and butanol; or a carboxylic acid such as acetic acid, and adding the above mentioned reducing agent to the solution or suspension.

The reaction temperature is not particularly critical, but the reaction is generally conducted at a temperature ranging from room temperature to the boiling point of the solvent used, preferably from 25° to 150°C. The reaction is performed sufficiently under atmospheric pressure, but it is possible to carry out the reaction under elevated pressure.

The intended hydroxy methyl product of the formula (XXIII) can be isolated in a pure form by distilling off the organic solvent from the reaction mixture, throwing the residue into a non-solvent such as water, and recovering the insoluble matter by filtration or extraction, if necessary, followed by recrystallization or chromatography.

The halogenation of the hydroxymethyl product of the formula (XXIII) may be carried out under halogenation conditions known per se. Of course, the halogenation reagent to be used should not be such as will react with the isoxazole ring. The halogenation reagents to be used include a phosphorus trihalide such as $PCl_3$, $PBr_3$ and $PI_3$, a phosphorus pentahalide such as $PCl_5$, $PBr_5$, or a phosphoryl halide such as $POCl_3$, $POBr_3$ and $POI_3$. It is preferable to conduct the reaction with the use of such hydrogenation reagent in an amount greater than the equivalent amount based on the hydroxymethyl product of the formula (XXIII), especially 1 to 3 equivalents. In case the hydrogenation reagent in an amount greater than the equivalent amount is used, the dehydrogenation at the position between C-4 and C-5 of ring B (namely, the formation of a carbon-to-carbon double bond at the position between C-4 and C-5 and the halogenation of ring A as well as the halogenation of the hydroxymethyl group sometimes occur coincidentally in the compounds saturated at the position between C-4 and C-5 depending upon the polarity of the solvent used. Even though such reactions occur, they do not detract from accomplishing the objects of this invention.

The reaction temperature is not particularly critical but generally a temperature ranging from 50° to 150°C. is adopted. As the reaction medium, inert organic solvents, for instance, halogenated hydrocarbons, such as carbon tetrachloride, chloroform, and chlorobenzene; hydrocarbons such as benzene, toluene, xylene and kerosene; or ethers, such as ethyl ether and tetrahydrofuran are preferably used. The reaction is preferably conducted at the boiling point of the solvent used.

According to still another embodiment of this invention, a method is provided of producing compounds of the general formula

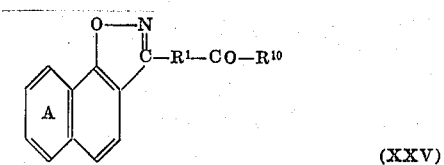

wherein ring A may be substituted with optional substituents, $R^1$ represents a methylene group, and $R^{10}$ represents an alkoxy group of 4 or less carbon atoms, an amino group, an amino alkoxy group or an aminoalkyl amino group, which comprises dehydrogenating a compound of the general formula

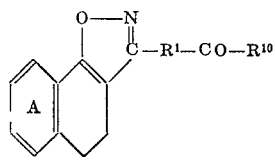

(XXIV)

where A, R¹ and R¹⁰ have the same meanings as defined above, in an organic solvent having no relation to the reaction.

In accordance with this embodiment, dihydronaphthisoxazole derivatives of the above mentioned formula (XXIV) are dehydrogenated under such mild conditions that do not cause any change in the isoxazole ring. Dehydrogenating agents particularly suitable for attaining the object of this invention include:

1. chloranil and DDQ (dichlorodicyanobenzoquinone);
2. mild oxidants such as anhydrous chromic acid in acetic acid;
3. molecular halogens such as $Cl_2$, $BR_2$ and $I_2$, and
4. phosphorus pentahalides such as $PCl_5$, $PBr_5$ and $PI_5$.

Reaction conditions vary depending upon the class of the dehydrogenating agent, but the dehydrogenation is generally carried out at temperatures ranging from room temperature to 200°C.

When using a dehydrogenating agent such as chloranil and DDQ, it is preferable to carry out the dehydrogenation with the use of an inert organic solvent such as benzene, toluene and xylene at the boiling point of the solvent. When using anhydrous chromic acid in acetic acid as the dehydrogenating agent, it is desirable to perform the reaction at a temperature within a range from room temperature to 50°C. When the reaction temperature exceeds the above range, a side reaction occurs at the isoxazole ring. When using a molecular halogen as the dehydrogenating agent, it is preferable to dissolve the molecular halogen in a halogenated hydrocarbon medium such as carbon tetrachloride and chloroform, and to conduct the reaction at the boiling point of the solvent to be used. In this case, the reaction may be conducted with or without the aid of an activating agent such as a catalyst or light. When using a phosphorus pentahalide as the dehydrogenating agent, a phosphorus trihalide, a phosphorus oxyhalide, a halogenated hydrocarbon or other inert organic solvent such as benzene is used as the reaction medium and preferably the reaction is carried out at the boiling point of the solvent.

When using a molecular halogen or a phosphorus pentahalide, the use of such dehydrogenating agents in an excessive amount sometimes results in the introduction of a halogen substituent into ring A of the naphthisoxazole, but the introduction of such halogen substituent does not bring about any disadvantage in the object of this embodiment of introducing a carbon-to-carbon double bond at the position between C-4 and C-5 of ring B of the 4,5-dihydronaphthisoxazole.

According to still another embodiment of this invention, a method is provided of producing compounds of the general formula

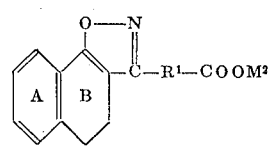

(XXVII)

wherein ring A may be substituted with optional substituents having no relation to the reaction, ring B may have a carbon-to-carbon double bond at the position between C-4 and C-5, R¹ represents a methylene group, and M² is hydrogen or a base, which comprises hydrolyzing a compound of the general formula

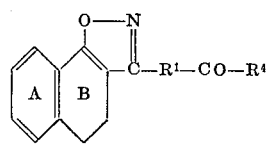

(XXVI)

wherein A, B and R¹ have the same meanings as defined above, and R⁴ represents an alkoxy or amino group, and then optionally treating the hydrolyzate with an acid or a base.

The starting compounds expressed by the general formula (XXVI) may be the above mentioned alkyl ester compounds or amide compounds. The hydrolysis of the compounds of the formula (XXVII) may be generally performed by procedures known per se, for instance, by employing an acid or an alkali. Ordinarily, the hydrolysis can be easily carried out by dissolving an ester or amide of the formula (XXVII) in an organic solvent, and adding to the resulting solution an aqueous solution of a mineral acid such as sulfuric acid or hydrochloric acid, an aqueous suspension of a strong acid cation exchange resin of a sulfonic acid type, or an aqueous solution of a base such as caustic soda, caustic potash or calcium hydroxide. The hydrolysis temperature is not particularly critical, but the hydrolysis is desirably carried out at a temperature up to the boiling point of the solvent, especially at a temperature within a range from 50° to 100°C.

When the hydrolysis is conducted with the use of an acid, a free carboxylic acid is obtained. This free carboxylic acid may be converted to its salt form by treating the reaction mixture directly with the above mentioned base, or by isolation of the carboxylic acid from the reaction mixture and then treating the same with the base.

When the hydrolysis is conducted with the use of an alkali, an alkali metal caboxylate is obtained. The salt may be recovered as it is or in the form of a free carboxylic acid after the treatment with an acid.

According to still another embodiment of this invention a method is provided of producing compounds of the general formula

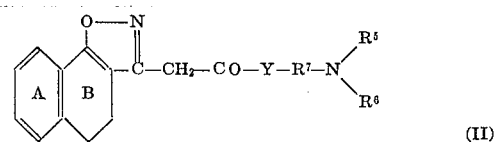

(II)

wherein ring A may be substituted with optional substituents, ring B may have a carbon-to-carbon double bond at the position between C-4 and C-5, Y is an oxygen atom or a group of the formula

(in which $R^8$ is a hydrogen atom or an alkyl group of 4 or less carbon atoms), $R^5$ and $R^6$ each represent an alkyl group, or may be bonded together directly or through an oxygen or nitrogen atom to form together with the nitrogen atom a 5- or 6-membered heterocyclic ring, and $R^7$ is an alkylene group, which comprises reacting a compound of the general formula

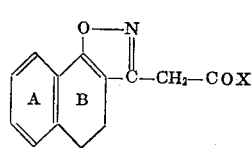

(XXVIII)

wherein A and B have the same meanings as defined above, and X represents a halogen or a hydroxyl group, with a compound of the general formula

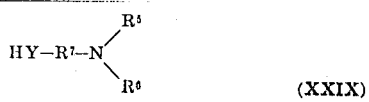

(XXIX)

wherein Y, $R^5$, $R^6$ and $R^7$ have the same meanings as defined above.

The reaction may be conducted in a solvent having no relation to the reaction, for instance, an aromatic hydrocarbon such as benzene or toluene, an ether such as tetrahydrofuran, or a halogenated hydrocarbon such as chloroform, at temperatures ranging from room temperature to the boiling point of the solvent used. In order to promote the reaction, it is possible to use an acid binder, for instance, a tertiary amine such as triethyl amine, pyridine and dimethyl aniline. When using the amine of the formula (XXIX) in an excessive amount, the use of such acid binder may be omitted.

The acid halide of the formula (XXVIII) can be easily prepared by reacting an ethanoic acid of the general formula (III) with a phosphorus trihalide or pentahalide in an organic solvent having no relation to the reaction at a temperature ranging from room temperature to the boiling point of the solvent used.

As the aminoalcohol or aminoalkyl amine, the compounds which are detailed hereinabove may be used.

The novel compounds of this invention expressed by the above mentioned general formula (I) have excellent analgesic, anti-pyretic and anti-inflammatory activities, and have a prominent advantage that they exhibit a much lower toxicity as compared with conventional non-steroidal anti-inflammation agents. They have another advantage that in oral administration they do not cause any troubles to digestive organs, particularly any gastroenteric disturbances or disorders.

Further, compounds of above general formula (I) in which R is a group —O(M)1/m, namely naphthisoxazoly alkanoic acid salts, have a much higher solubility than the free alkanoic acids, and they are easily soluble in carriers and base materials of various medicinal formulations, such as aqua pro injection, internal medicines, creams, ointments, adhesive plasters and other medicines for external application. Accordingly, they are very pharmaceutically useful. Still further, in such salts, side effects other than the desired pharmacological activities are reduced, or their absorption rate is heightened, whereby it is possible to promptly increase their concentrations in blood. Moreover, when organic bases having pharmacological activities by themselves are used as the base M, the pharmacological activities of said organic bases are added arithmetically or synergistically to the pharmacological activities of the free acids. In such case, compounds are provided which are pharmaceutically very useful and important.

The novel compounds of this invention may be used in forms of various formulations for the remedy of arthritis, rheumatism and other various inflammatory diseases. The novel naphthisoxazolyl alkanoic acids and their derivatives may be administered to patients orally or by hypodermic or intramuscular injection. For the oral administration, the novel compounds of this invention may be blended with a carrier known per se such as lactose, starch, talc, magnesium carbonate, alumina, tragacanth gum or arabic rubber and applied in the form of powder, tablets, capsules, granules or the like, or they may be applied in the form of a liquid formulation prepared by dispersing them in a liquid carrier such as water and syrup. For the hypodermic or intramuscular injection, the novel compounds of this invention may be administered in the form dissolved or dispersed in sodium chloride physiological solution or sterilized distilled water.

The suitable doses of the novel compounds of this invention must be differentially decided depending on the condition, age, sex, medical history and constitution of a patient and the class of the compound to be administered, but generally, sufficient curing effects can be attained by an administration of 10 to 100 mg per dose, 10 to 300 mg per day.

This invention will be described in more detail hereinbelow by referring to the following Examples which are presented for purposes of illustration only and are not intended to limit the disclosed invention.

EXAMPLE 1

Some 6.08 g of 3-bromomethyl-7-methoxy-4,5-dihydronaphth [2,1-d] isoxazole and 2.94 g of sodium cyanide were added to 100 ml of a mixed solution of equal volumes of ethanol and water, and the mixture was heated on a water bath for 7 hours. After cooling, the reacting mixture was thrown into 500 ml of water, and the precipitated crude crystals were collected by filtration and recrystallized from benzene. By this procedure, 4.08 g of 3-carbamoylmethyl-7-methoxy-4,5-dihydronaphth [2,1-d] isoxazole melting at 185°–187°C. were obtained.

The infrared absorption spectrum of the so obtained compound was as follows:

$\nu_{NH}^{KBr}$: 3250 cm$^{-1}$, 3420 cm$^{-1}$
$\nu_{CO}^{KBr}$: 1675 cm$^{-1}$

Then 2.6 g of the 3-carbamoylmethyl-7-methoxy-4,5-dihydronaphth [2,1-d] isoxazole were added to a solution which was made by dissolving 4 g of sodium hydroxide in a mixed liquor of 30 ml. of methanol and 30 ml. of water, and the mixture was heated on a water bath for 3 hours to conduct hydrolysis. Thereafter, the reaction mixture was thrown into a great quantity of water, followed by filtration. The filtrate was made acidic by addition of hydrochloric acid, the formed precipitates were collected as crude crystals by filtration and the precipitates were recrystallized from methanol. In this way, 2 g of 3-hydroxycarbonylmethyl-7-methoxy-4,5-dihydronaphth [2,1-d] isoxazole having a melting point of 166°–167°C. were obtained.

The starting compound was synthesized in the following manner:

Some 5.61 g of 3-methoxycarbonyl-7-methoxy-4,5-dihydronaphth [2,1-d] isoxazole were dissolved in 100 ml of tetrahydrofuran, to which 0.76 g of lithium aluminum hydride was added. This solution was heated on a water bath for 2 hours. After cooling, a small amount of ethyl acetate was added to the reaction mixture to decompose the unreacted lithium aluminum hydride, and then ether was added for extraction after making the system acidic with hydrochloric acid. The ether layer was dried with salt cake and the solvent was distilled off. The recrystallization of the residue from methanol gave 4.1 g of 3-hydroxymethyl-7-methoxy-4,5-dihydronaphth [2,1-d] isoxazole having a melting point of 108°–111°C. as colorless, platelet-like crystals.

Then 4.6 g. of 3-hydroxymethyl-7-4,5-dihydronaphth [2,1-d] isoxazole were dissolved in 50 ml of chloroform, and 8.1 g of phosphorus tribromide were added dropwise to the solution. Then, the solution was heated on a water bath for 1 hour and was concentrated under reduced pressure. The resulting residue was recrystallized from benzene and petroleum ether. In this way, 3.2 g of 3-bromomethyl-7-methoxy-4,5-dihydronaphth [2,1-d] isoxazole having a melting point of 91°–93°C. were obtained.

EXAMPLE 2

Some 6.1 g of 3-bromomethyl-8-methoxy-4,5-dihydronaphth [2,1-d] isoxazole and 3 g of potassium cyanide were added to 100 ml of a mixed solution of equal volumes of methanol and water, and the mixture was heated on a water bath for 7 hours. After cooling, the reaction mixture was thrown into a great quantity of water, and the precipitates formed as crude crystals were collected by filtration. In this way, 3.9 g of 3-carbamoylmethyl-8-methoxy-4,5-dihydronaphth [2,1-d] isoxazole having a melting point of 194°–196°C. were obtained. Then 2.58 g of the 3-carbamoylmethyl-8-methoxy-4,5-dihydronaphth [2,1-d] isoxazole were added to a solution which was prepared by mixing 20 ml of ethanol with a solution of 3.42 g of potassium hydroxide in 40 ml of water, and the resulting solution was subjected to hydrolysis for 2 hours by heating on a water bath. Then, the reaction solution was thrown into 300 ml of water and was filtered. The filtrate was made acidic with hydrochloric acid, and the precipitates formed as crude crystals were collected by filtration and recrystallized from methanol. Following this procedure, 2.1 g of 3-hydroxymethyl-8-methoxy-4,5-dihydronaphth [2,1-d] isoxazole having a melting point of 186°–188°C. were obtained. (Infrared absorption spectrum: $c_o^{KBr}$ 1720 cm$^{-1}$).

The starting compound was synthesized by the following method:

Some 5.6 g of 3-ethoxycarbonyl-8-methoxy-4,5-dihydronaphth [2,1-d] isoxazole and 0.8 g of lithium aluminum hydride were added to 100 ml of tetrahydrofuran, followed by heating on a bath for about 2 hours. After cooling, the reaction mixture was treated with ethyl acetate and hydrochloric acid, and extracted with ether. The ether layer was treated by a customary method and then the solvent was distilled off. The recrystallization of the residue from acetone gave 3.7 g of 3-hydroxymethyl-8-methoxy-4,5-dihydronaphth [2,1-d] isoxazole having a melting point of 81°–83°C.

Then 4.6 g of 3-hydroxymethyl-8-methoxy-4,5-dihydronaphth [2,1-d] isoxazole and 9 g of phosphorus tribromide were added into dried chloroform, and the mixture was treated by the same procedures as adopted in Example 1 for preparing the starting compound. In this way, 4.5 g of 3-bromomethyl-8-methoxy-4,5-dihydronaphth [2,1-d] isoxazole having a melting point of 94°–96°C. were obtained.

EXAMPLE 3

Some 5.28 g of 3-bromomethyl-4,5-dihydronaphth [2,1-d] isoxazole and 3 g of sodium cyanide were added in 100 ml of hydrous alcohol, and the solution was heated on a water bath for 5 hours. After completion of the reaction, the reaction mixture was thrown into water, and the precipitates formed as crude crystals were collected by filtration and recrystallized from benzene. In this way, 3.75 g of 3-carbamoylmethyl-4,5-dihydronaphth [2,1-d] isoxazole having a melting point of 165°–167.5°C. were obtained.

The infrared absorption spectrum of the compound which was obtained was as follows:
$\nu_{NH}^{KBr}$ 3240 cm$^{-1}$, 3430 cm$^{-1}$
$\nu_{CD}^{KBr}$ 1670 cm$^{-1}$ Then 2.3 g of the 3-carbamoylmethyl-4,5-dihydronaphth [2,1-d] isoxazole were added in a mixed solution of 40 ml of 10% aqueous solution of potassium hydroxide and 20 ml of ethanol, followed by heating on a water bath for 2 hours. After completion of the reaction, the reaction mixture was thrown into water and made acidic with hydrochloric acid. The precipitates formed as crude crystals were recrystallized from acetone. As a result, 2.01 g of 3-hydroxycarbonylmethyl-4,5-dihydronaphth [2,1-d] isoxazole having a melting point of 180°–183°C. were obtained. (Infrared absorption spectrum: $\nu_{C=O}^{KBr}$ 1725 cm$^{-1}$).

The starting compound was synthesized by the following method:

A. Some 22.9 g of 3-methoxycarbonyl-4,5-dihydronaphth [2,1-d] isoxazole and 3.8 g of lithium aluminum hydride were added in 100 ml of tetrahydrofuran and the mixture was heated for about 3 hours. After cooling, a small amount of water was added to the mixture to decompose the unreacted lithium aluminum hydride, and then the mixture was made acidic with hydrochloric acid, followed by extraction with ether. The ether layer was dried with salt cake and the solvent was distilled off. The recrystallization of the residue from methanol gave 12.5 g of 3-hydroxymethyl-4,5-dihydronaphth [2,1-d] isoxazole melting at 92°–94°C. as colorless needle-like crystals. (Infrared absorption spectrum: $\nu_{O-H}^{KBr}$ 3230 cm$^{-1}$).

B. Some 23 g of 3-methoxycarbonyl-4,5-dihydronaphth [2,1-d] isoxazole were dissolved in 100 ml of tetrahydrofuran, and 15 ml of a 70% solution of sodium dihydro-bis (2-methoxyethoxy) aluminate dissolved in benzene were added to the above solution with stirring. Then, the mixture was stirred for about 1 hour. Then, water was added to the mixture, and the system was treated with 10% hydrochloric acid, followed by extraction with ether. The ether solution was washed with water and after drying with salt cake, the ether was distilled off, and the residue was recrystallized from acetone. As a result, 15.4 g of 3-hydroxymethyl-4,5-dihydronaphth [2,1-d] isoxazole having a melting point of 91°–93°C. were obtained as colorless needle-like crystals.

Then 16.08 g of 3-hydroxymethyl-4,5-dihydronaphth [2,1-d] isoxazole and 24.4 g of phosphorus tribromide were treated in 100 ml of chloroform, by the same procedures as described in Example 1 for preparing the starting compound. In this way, 11.5 g of 3-bromomethyl-4,5-dihydronaphth [2,1-d] isoxazole having a melting point of 87°–90°C. were obtained.

EXAMPLE 4

Some 5.2 g of 3-bromomethyl-naphth [2,1-d] isoxazole and 2.0 g of sodium cyanide were heated under reflux for 5 hours in a mixed solution of 50 ml of ethanol and 20 ml of water. After completion of the reaction, the reaction mixture was thrown into 300 ml of water, and the precipitates formed as crystals were collected by filtration. As a result, 4.1 g of 3-carbamoylmethylnaphth [2,1-d] isoxazole were obtained as crystals. This compound was heated for 1 hour together with 1.6 g of sodium hydroxide, 30 ml of methanol and 50 ml of water for hydrolysis. After completion of the reaction, the reaction mixture was made acidic with hydrochloric acid and precipitates were formed as white crystals. Recrystallization of the white crystals from methanol gave 3.2 g of naphth [2,1-d] isoxazolylethanoic acid having a melting point of 182°–185°C. [IR $\nu_{C=O}^{KBr}$ 1725 cm$^{-1}$].

The starting compound was obtained by treating 3-bromomethyl-4,5-dihydronaphth [2,1-d] isoxazole with chloranil or phosphorus pentachloride in carbon tetrachloride.

More specifically, 2.6 g of 3-bromomethyl-4,5-dihydronaphth [2,1-d] isoxazole were dissolved in 50 ml of carbon tetrachloride, 12 g of phosphorus pentachloride were added to the solution, and the solution was refluxed on a water bath for 16 hours. The reaction mixture was thrown into water, and the precipitates formed as crystals were collected by filtration, dried and recrystallized from tetrahydrofuran. Thus, 1.8 g of 3-bromomethyl-naphth [2,1-d] isoxazole having a melting point of 185°–187°C. were obtained as white needle-like crystals.

The results of the examination of infrared and ultra-violet absorption spectra of the above compound are as follows:

Infrared absorption spectrum: $\nu_{C=O}^{KBr}$ 1750 cm$^{-1}$
Ultra-violet absorption spectrum: $\lambda_{max}^{CHCl_3}$
  258 mµ (ε: 21,500)
  343 mµ (ε: 5,300)

EXAMPLE 5

Some 6.5 g of 3-bromomethyl-6-chloro-7-methoxynaphth [2,1-d] isoxazole and 2.0 g of sodium cyanide were heated under reflux for 5 hours in a mixed solution of 50 ml of ethanol and 20 ml of water. After completion of the reaction, the reaction mixture was thrown into 300 ml of water, and the precipitates formed as crystals were collected by filtration. As a result, 4.8 g of 3-carbamoylmethyl-6-chloro-7-methoxynaphth [2,1-d] isoxazole were obtained. The crystals were heated for 1 hour together with 1.6 g of sodium hydroxide, 30 ml of methanol and 50 ml of water for performing the hydrolysis reaction. After completion of the reaction, the reaction mixture was made acidic with hydrochloric acid to precipitate white crystals. The crystal precipitates were recrystallized from methanol. As a result, 3.0 g of 6-chloro-7-methoxynaphth [2,1-d] isoxazolylethanoic acid having a melting point of 179°–181°C. were obtained as white platelet-like crystals. [IR $\nu_{max}^{KBr}$ cm$^{-1}$ 1718 (C=O)].

The starting compound was synthesized by the following methods.

A. Some 2.94 g of 3-bromomethyl-7-methoxy-4,5-dihydronaphth [2,1-d] isoxazole were dissolved in 50 ml of chloroform, and 4.5 g of phosphorus pentachloride were added to the solution, followed by heating under reflux for 3 hours at the temperature corresponding to the boiling point of chloroform. After completion of the reaction, the reaction mixture was thrown into ice and the chloroform layer was recovered by separation. After washing with water and drying, chloroform was distilled off, and the residue was recrystallized from chloroform and methanol. In this way, 1.6 g of 6-chloro-3-bromomethyl-7-methoxynaphth [2,1-d] isoxazole having a melting point of 203°–206°C. were obtained as colorless needle-like crystals. The ultra-violet absorption spectrum of the so obtained compound is as follows:

$\lambda_{max}^{EtOH}$
  253 mµ (ε: 22,000)
  298 mµ (ε: 6,600)
  329 mµ (ε: 3,900)
  344 mµ (ε: 4,100)

B. Also 2.6 g of 7-methoxy-3-methoxycarbonyl-4,5-dihydronaphth [2,1-d] isoxazole were dissolved in 50 ml of carbon tetrachloride, 12 g of phosphorus pentachloride were added to the solution. After heating under reflux on a water bath for 16 hours, the reaction mixture was poured into ice water. The formed crystal precipitates were collected by filtration, dried and recrystallized from tetrahydrofuran. As a result, 1,8 g of 7-methoxy-3-methoxycarbonylnaphth [2,1-d] isoxazole were obtained as white needle-like crystals.

The results of examination of infrared and ultra-violet absorption spectra and of the elemental anaylsis of the so obtained compound are as follows:

Infrared absorption spectrum $\nu_{C=O}^{KBr}$ 1750 cm$^{-1}$
Ultra-violet absorption spectrum: $\lambda_{max}^{CHCl_3}$
  259 mµ (ε= 21,000)
  343 mµ (ε=5,300)
Elemental analysis values:
Calculated: C = 65.37(%), H = 4.28(%), N = 5.45(%).
Measured: C = 65.59(%), H = 4.21(%), N = 5.39(%).

Some 0.93 g of lithium aluminum hydride was suspended in 100 ml of tetrahydrofuran. Separately, 6.4 g of 7-methoxy-3-methoxycarbonylnaphth [2,1-d] isoxazole were dissolved in 100 ml of tetrahydrofuran. The solution of 7-methoxy-3-methoxy-carbonylnaphth [2,1-d] isoxazole dissolved in tetrahydrofuran was added dropwise into the suspension of lithium aluminum hydride in tetrahydrofuran. Then, the mixture was heated under reflux for 3 hours. After completion of the reaction, the solution was cooled to room temperature and the excessive lithium aluminum hydride was decomposed. Then the resulting inorganic substances were removed. After distilling off the tetrahydrofuran, the residue was recrystallized from methanol. As a result, 5.2 g of 3-hydroxymethyl-7-methoxynaphth [2,1-d] isoxazole having a melting point of 151°–153°C.

were obtained as white platelet-like crystals. [IR $\nu_{-OH}{}^{KBr}$; 3410 cm$^{-1}$].

Then 4.2 g of the 3-hydroxymethyl-methoxynaphth [2,1-d] isoxazole were dissolved in 50 ml of chlororform, 8 g of phosphorus tribromide were added dropwise to the solution. Then, the mixture was heated on a water bath for 1 hour, and was concentrated under reduced pressure. The remaining residue was recrystallized from benzene. As a result, 3.8 g of 3-bromomethyl- 7-methoxynaphth [2,1-d] isoxazole having a melting point of 208°–210°C. were obtained.

C. Also 3.0 g of 6-chloro-7-methoxy-3-methoxycarbonyl-naphth [2,1-d] isoxazole were dissolved in 150 ml of anhydrous tetrahydrofuran, and 0.22 g of lithium aluminum hydride was added to the solution with stirring, and the mixture was heated for 4 hours. After cooling the reaction mixture to room temperature, it was treated with 10% sulfuric acid solution. Then, the reacted solution was extracted with 150 ml of chloroform, and after drying over salt cake and distilling off the solvent, white crystals were obtained. The recrystallization of the crystals from tetrahydrofuran-ethanol gave 2.0 g of 6-chloro-3-hydroxymethyl-7-methoxynaphth [2,1-d] isoxazole having a melting point of 210°–211°C. as colorless scale-like crystals.

The results of the examination of the infrared absorption spectrum and of the elementary analysis of the so obtained compound are as follows:

Infrared absorption spectrum: $\nu_{OH}{}^{KBr}$ 3380 cm$^{-1}$
Elementary analysis values:
Calculated: C = 59.20(%), H = 3.80(%), N = 5.31(%).
Measured: C = 59.01(%), H = 3.72(%), N = 5.11(%).

Some 4.7 g of 6-chloro-3-hydroxymethyl-7-methoxynaphth [2,1-d] isoxazole were dissolved in 50 ml of chloroform, and 8 g of phosphorus tribromide were added dropwise to the solution. Then, the solution was heated on a water bath for 1 hour, and was concentrated under reduced pressure. When the resulting residue was recrystallized from benzene, 4.5 g of 6-chloro-3-bromomethyl-7-methoxynaphth [2,1-d] isoxazole having a melting point of 203°–205°C. were obtained as colorless, needle-like crystals. The ultra-violet absorption spectrum of the compound was as follows:

$\lambda_{max}{}^{EtOH}$
253 mμ (ε: 22,000)
298 mμ (ε: 6,600)
329 mμ (ε: 3,900)
344 mμ (ε: 4,100)

EXAMPLE 6

Some 3 g of 3-cyanomethyl-7-methoxy-4,5-dihydronaphth [2,1-d] isoxazole were added to 100 ml of a mixed solution of equal volumes of ethanol and 10% aqueous solution of sodium hydroxide, and then the mixture was heated on a water bath for 3 hours. After cooling, the reaction mixture was thrown into 500 ml of water, and the formed crystals were separated by filtration. When the filtrate was made acidic with hydrochloric acid, 2.5 g of 7-methoxy-4,5-dihydronaphth [2,1-d] isoxazolyl-3-ethanoic acid were obtained. The recrystallization of the compound from methanol-benzene gave colorless needle-like crystals having a melting point of 164°–167°C.

The starting compound was synthesized by the following method.

Some 13.2 g of 3-bromomethyl-7-methoxy-4,5-dihydronaphth [2,1-d] isoxazole and 4.9 g of sodium cyanide were heated under reflux of 4 hours in 100 ml of ethanol. After completion of the reaction, the reaction mixture was thrown into about 500 ml of water, and the formed crystals were recrystallized from methanol. Thus, 8.9 g of 3-cyanomethyl-7-methoxy-4,5-dihydronaphth [2,1-d] isoxazole having a melting point of 118°–121°C. were obtained as white needle-like crystals. The results of the examination of the infrared absorption spectrum and of the elementary analysis of the so formed compounds are as follows:

Infrared absorption spectrum: IR $\nu_{-C=N}{}^{KBr}$; 2275 cm$^{-1}$
Elementary analysis values:

| Calculated | Measured |
|---|---|
| C: 69.99(%) | 69.73(%) |
| H: 5.05(%) | 5.21(%) |
| N: 11.61(%) | 11.58(%) |

EXAMPLE 7

Some 5.8 g of 3-cyanomethyl-4,5-dihydronaphth [2,1-d] isoxazole were added to 150 ml of a mixed solution of equal volumes of ethanol and 10% aqueous solution of sodium hydroxide, and the solution was heated on a bath for 3 hours. After completion of the reaction, the reaction mixture was thrown into 500 ml of water and made acidic with hydrochloric acid. Then, 4.4 g of the 4,5-dihydronaphth [2,1-d] isoxazolyl-3-ethanoic acid obtained were recrystallized from acetone to form sand-like crystals having a melting point of 181°–183°C.

The starting compound was synthesized by the following method:

Some 5.3 g of 3-bromomethyl-4,5-dihydronaphth [2,1-d] isoxazole and 2.9 g of sodium cyanide were heated under reflux for 4 hours in 100 ml of ethanol. After completion of the reaction, the reaction mixture was thrown into about 500 ml of water, and the formed crystals were recrystallized from methanol. As a result, 2.9 g of 3-cyanomethyl-4,5-dihydronaphth [2,1-d] isoxazole having a melting point of 78°–80°C. were obtained as white platelet-like crystals.

The results of the examination of the infrared absorption spectrum and of the elementary analysis of the so formed compound are as follows:

Infrared absorption spectrum: IR $\nu_{-C=N}{}^{KBr}$; 2175 cm$^{-1}$
Elementary analysis values:

| Calculated | Measured |
|---|---|
| C: 74.27(%) | 74.39(%) |
| H: 4.79(%) | 4.65(%) |
| N: 13.32(%) | 13.15(%) |

EXAMPLE 8

Some 4.05 g of 7-methoxy-4,5-dihydronaphth [2,1-d] isoxazolyl-3-diazomethylketone were added to 200 ml of dried methanol, to which 600 mg of silver oxide, the solution was heated for 2 hours. After completion of the reaction, carbon powder was added to the reaction mixture, the solution was filtered, and the filtrate was concentrated. Then, the so formed crystals were recrystallized from methanol, whereby 3.2 g of 3-methoxycarbonylmethyl-7-methoxy-4,5- dihydronaphth [2,1-d] isoxazole having a melting point of 85°–87°C. were obtained as white platelet-like crystals. The infrared absorption spectrum of the so obtained compound showed on absorption at 1745 cm$^{-1}$ (C=O), and the absorption of the ultra-violet absorption spectrum were observed at $\lambda_{max}^{EtOH}$ 223 m$\mu$ ($\epsilon$: 22,600) and 292 m$\mu$ ($\epsilon$: 36,300). The elementary analysis values of the compound are as follows:

Calculated C = 65.92(%), H = 5.53(%), N = 5.13(%).

Measured C = 66.12(%), H = 5.26(%), N = 4.84(%).

The starting compound was synthesized by the following method:

Some 5.5 g of 7-methoxy-4,5-dihydronaphth [2,1-d] isoxazolyl-3-carboxylic acid were added to anhydrous carbon tetrachloride, and then 10 g of thionyl chloride were added thereto. Then, the solution was heated on a water bath until the generation of hydrogen chloride gas was stopped, and then the solution was concentrated under reduced pressure. As a result, 4.5 g of 7-methoxy-4,5-dihydronaphth [2,1-d] isoxazolyl-3-carboxy chloride having a melting point of 135°–136.5°C. were obtained. The infrared absorption spectrum of the compound showed absorptions at $\nu$KBr cm$^{-1}$: 1776, 1638, 1605, 1467, 1415, 1250, 1028, and 822.

Then 13.2 g of the 7-methoxy-4,5-dihydronaphth [2,1-d] isoxazolyl-3-carboxy chloride were dissolved in a mixed solution of 200 ml of ether and 200 ml of tetrahydrofuran. Separately, 200 ml of an ether solution of diazomethane obtained by decomposition of 62 g of nitrosomethylurea were kept at 0°–5°C., to which the tetrahydrofuran solution of the former compound was added dropwise. After completion of the addition, the temperature was cooled to room temperature and the solution was allowed to stand over night and the formed crystals were collected by filtration. As a result, 6.2 g of 6-methoxy-4,5-dihydronaphth [2,1-d] isoxazolyl-3-diazoketone having a melting point of 167°–168°C. were obtained as yellow platelet-like crystals. The infrared absorption spectrum of the so obtained compound showed a strong absorption at 2094 cm$^{-1}$ due to the diazomethyl group, —CHN$_2$.

The ultra-violet absorption spectrum showed an absorption at $\lambda_{max}^{EtOH}$ 298 m$\mu$ ($\epsilon$: 13,400). The elementary analysis values of the compound are as follows:

Calculated: C = 64.86(%), H = 5.05(%), N = 5.40(%).

Measured: C = 64.56(%), H = 4.61(%), N = 5.33(%).

In the case of using ethyl alcohol, propyl alcohol, isopropyl alcohol, n-butyl alcohol and iso-butyl alcohol instead of methanol, the following compounds were obtained: namely, 3-ethoxycarbonylmethyl-7-methoxy-4,5-dihydronaphth [2,1-d] isoxazole, 3-propoxycarbonylmethyl-7-methoxy-4,5-dihydronaphth [2,1-d] isoxazole, 3-isopropoxycarbonylmethyl-7-methoxy-4,5-dihydronaphth [2,1-d] isoxazole, 3-n-butoxycarbonyl-methyl-7-methoxy-4,5-dihydronaphth [2,1-d] isoxazole, and 3-isobutoxycarbonylmethyl-7-methoxy-4,5-dihydronaphth [2,1-d] isoxazole.

The formation of each of the above compounds was confirmed by the absorption in the infrared absorption spectrum in the vicinity of $\nu_{CO}^{KBr}$ 1730–1740 cm$^{-1}$ due to the carbonyl group of the ester.

EXAMPLE 9

Some 16.2 g of 4,5-dihydronaphth [2,1-d] isoxazolyl-3-diazoketone were added to 300 ml of dried methanol, and 2.4 g of silver oxide were gradually added thereto, with heating. After completion of the addition of silver oxide, the solution was heated for 2 hours. After completion of the reaction, carbon powder was added to the reaction mixture, the solution was filtered and the filtrate was concentrated. In this way, 14.0 g of 3-methoxycarbonylmethyl-4,5-dihydronaphth [2,1-d] isoxazole were obtained as an oily substance. The infrared absorption spectrum of the product showed a strong absorption at 1743 cm$^{-1}$ due to C=O. The so obtained oily substance was heated at 60°C. for 2 hours in a mixed solution of 6 g of caustic soda, 30 ml of water and 50 ml of methanol. Then the solution was cooled to room temperature. As a result, a solution of the sodium salt of 4,5-dihydronaphth [2,1-d] isoxazolyl-3-ethanoic acid was obtained. A half volume of the solution was concentrated under reduced pressure to dryness. The recrystallization of the dried residue gave 6.1 g of the compound as a white powder.

The remaining half of the solution was dissolved in water of a volume about five times as large as that of the above solution, and when the resulting solution was made acidic with hydrochloric acid, crystals were formed. When these crystals were recrystallized from methanol, 5.5 g of 4,5-dihydronaphth [2,1-d] isoxazolyl-3-ethanoic acid were obtained. The melting point of the crystals was 178°–179°C. The infrared absorption spectrum of the so obtained acid showed a strong absorption at 1725 cm$^{-1}$ due to C=O of the carboxylic acid, and the ultra-violet absorption spectrum showed absorptions at $\lambda_{max}^{EtOH}$ 223 m$\mu$ ($\epsilon$: 15,080) and 283 ($\epsilon$: 17,018). The elementary analysis values of the compound as C$_{13}$H$_{11}$O$_3$N are as follows:

Calculated: C = 68.12(%), H = 4.84(%), N = 6.11(%).

Measured: C = 67.84(%), H = 4.90(%), N = 6.17(%).

The starting compound was synthesized by the following method:

Some 5 g of 4,5-dihydronaphth [2,1-d] isoxazolyl-3-carboxylic acid were added to anhydrous chloroform, and 10 g of phosphorus pentachloride were further added thereto. Then, the solution was heated on a water bath for 3 hours, and was concentrated to dryness under reduced pressure. About 5 g of 4,5-dihydronaphth [2,1-d] isoxazolyl-3-carboxylic chloride were obtained. The product melted at 68°–69°C., and exhibited absorptions at $\nu$KBr cm$^{-1}$: 1770, 1640, 1410, 825, 760, and 765 in the infrared absorption spectrum.

Also 13 g of 4,5-dihydronaphth [2,1-d] isoxazolyl-3-carboxy chloride were dissolved in 200 ml of ether. Separately, diazomethane obtained by decomposition of 35 g of nitrosourea was dissolved in 300 ml of ether which was cooled with cryogen and kept at a temperature between 0° and 5°C. The former solution was added dropwise to the latter solution. Prior to the addition, 6.1 g of triethylamine were added as dehydrochlorinating agent to the diazomethane solution. After completion of the addition, the temperature of the solution was restored to room temperature, and the solution was allowed to stand overnight, washed with water and dried with salt cake. Then, ether was distilled off. In this way, 11.2 g of 4,5-dihydronaphth [2,1-d]

isoxazolyl-3-diazoketone having a melting point of 114°–120°C., were obtained as yellow platelet-like crystals, which exhibited an absorption at 2110 cm$^{-1}$ due to —CHN$_2$$^+$ of the diazomethyl in the infrared absorption spectrum and absorptions at $\lambda_{max}^{EtOH}$ 299 m$\mu$ ($\epsilon$: 15,400) and 303 m$\mu$ ($\epsilon$: 20,045) in the ultra-violet absorption spectrum.

EXAMPLE 10

Some 8 g of 7-methoxy-4,5-dihydronaphth [2,1-d] isoxazolyl-3-diaketone were added to 100 ml of diethylamine, and 1.2 g of silver oxide were further added thereto. Then, the mixture was refluxed for 1 hour. After completion of the reaction, silver oxide was removed by filtration. When the filtrate was subjected to distillation, an oily substance was obtained. Then, it was purified by liquid chromatography and recrystallized from acetone. In this way, 2.4 g of 3-N,N-Diethylcarbamoylmethyl-7-methoxy-4,5-dihydronaphth [2,1-d] isoxazole having a melting point of 101°–103°C. were obtained as white platelet-like crystals, which exhibited an absorption at 1630 cm$^{-1}$ due to C=O of the amide in the infrared absorption spectrum and an absorption at $\lambda_{max}^{EtOH}$ 291 m$\mu$ ($\epsilon$: 17,400) in the ultra-violet absorption spectrum.

EXAMPLE 11

Some 8 g of 7-methoxy-4,5-dihydronaphth [2,1-d] isoxazolyl-3-diazoketone were added to 100 ml of dipropylamine, and 1.2 g of silver oxide were further added thereto. Then, the mixture was refluxed for 1 hour. At the end of the reaction, the silver oxide was removed by filtration. When the filtrate was removed by distillation, an oily substance was obtained. This substance was purified by liquid chromatography, and recrystallized from acetone. As a result, 2.5 g of 3-N,N-dipropylcarbamoylmethyl-7-methoxy-4,5-dihydronaphth [2,1-d] isoxazole having a melting point of 62°–64°C. were obtained as white platelet-like crystals. Infrared absorption spectrum of the product showed an absorption at 1641 cm$^{-1}$ due to C=O of the amide.

EXAMPLE 12

Some 10 g of 8-methoxy-4,5-dihydronaphth [2,1-d] isoxazolyl-3-diazoketone were added to 120 ml of morpholine and 2.0 g of silver oxide were further added thereto. Then, the mixture was refluxed for 1.5 hours. After completion of the reaction, silver oxide was recovered by filtration, and when the filtrate was subjected to distillation, an oily substance was obtained. Then, the oil substance was purified by chromatography and recrystallized from acetone. As a result, 3.4 g of 3-N-morpholinocarbamoylmethyl-8-methoxy-4,5-dihydronaphth [2,1-d] isoxazole were obtained. The product exhibited an absorption at 1641 cm$^{-1}$ due to C=O of the amide in the infrared absorption spectrum.

EXAMPLE 13

Some 7 g of 7-methoxy-4,5-dihydronaphth [2,1-d] isoxazolyl-3-diazoketone were added to 100 ml of piperidine, and 1.3 g of silver oxide were further added thereto. Then, the mixture was treated by the same method as described in Example 12. As a result, 2.1 g of 3-N-piperidinocarbamoylmethyl-7-methoxy-4,5-dihydronaphth [2,1-d] isoxazole were obtained. The product exhibited an absorption at 1640 cm$^{-1}$ in the infrared absorption spectrum.

EXAMPLE 14

Some 8 g of 7-methoxy-4,5-dihydronaphth [2,1-d] isoxazolyl-3-diazoketone were added to 110 ml of pyrrolidone, and 1.5 g of silver oxide were further added thereto. Then, the mixture was treated by the same method as described in Example 12. As a result, 2.5 g of 3-N-pyrrolidinocarbamoylmethyl-7-methoxy-4,5-dihydronaphth [2,1-d] isoxazole were obtained. The product exhibited an absorption at 1640 cm$^{-1}$ in the infrared absorption spectrum.

EXAMPLE 15

Some 5 g of 8-methoxy-4,5-dihydronaphth [2,1-d] isoxazolyl-3-diazoketone were dissolved in 150 ml of anhydrous methanol, and 1.5 g of silver oxide were further added thereto Then, the mixture was heated under reflux on a water bath for 5 hours, and after addition of activated carbon, the mixture was subjected to filtration. When the filtrate was concentrated, 4.2 g of 3-methoxycarbonylmethyl-8-methoxy-4,5-dihydronaphth [2,1-d] isoxazole were obtained in the form of a yellow liquid. It exhibited absorptions at 1743 cm$^{-1}$ due to the carbonyl group of the ester and 2960 cm$^{-1}$ due to the methylene group in the infrared absorption spectrum according to the film method.

The starting compound was prepared by the following method:

Some 5.5 g of 8-methoxy-4,5-dihydronaphth [2,1-d] isoxazolyl-3-carboxylic acid were added to anhydrous chloroform, and 12 g of phosphorus pentachloride were further added thereto. Then, the mixture was heated on a water bath for 3 hours, and was concentrated under reduced pressure. As a result, 4.5 g of 8-methoxy-4,5-dihydronaphth [2,1-d] isoxazolyl-3-carboxy chloride melting at 99°–100°C. were obtained. The compound exhibited an absorption at $\nu_{co}^{KBr}$ 1765 cm$^{-1}$ in the infrared absorption spectrum.

Then 10 g of the 8-methoxy-4,5-dihydronaphth [2,1-d] isoxazolyl-3-carboxy chloride were dissolved in a mixed solvent of 100 ml of dried ether and 100 ml of dried tetrahydrofuran. The resulting solution was added dropwise with cooling and stirring to 800 ml of an ether solution of diazomethane obtained from 40 g of N-nitrosomethylurea in a customary manner. After completion of the addition, the stirring was further continued for 2 hours, and the reaction mixture was allowed to stand overnight in a refrigerator. On the following day, the solvent was removed by distillation and the remaining crystals were recrystallized from benzene. As a result, 9.5 g of 8-methoxy-4,5-dihydronaphth [2,1-d] isoxazolyl-3-diazoketone having a melting point of 136°–137°C. were obtained as colorless, needle-like crystals, which exhibited an absorption at $\nu$KBr 2110 cm$^{-1}$ due to the diazomethyl group in the infrared absorption spectrum.

EXAMPLE 16

Some 16 g of 4,5-dihydronaphth [2,1-d] isoxazolyl-3-diazoketone were added to 300 ml of a mixed solution of water and benzene, and 3 g of silver oxide were gradually added thereto. Then, the mixture was heated with stirring for 15 hours. After completion of the reaction, silver oxide was removed by filtration and the filtrate was concentrated to precipitate crude crystals of 4,5- dihydronaphth [2,1-d] isoxazolyl-3-ethanoic acid containing the unreacted starting compound. The crude crystals were collected by filtration and dissolved in 10% aqueous solution of sodium hydroxide, followed by filtration. The filtrate was then made acidic with hydrochloric acid, and the formed crude crystals were collected by filtration and recrystallized from acetone. As a result, 6.3 g of a crystal of 4,5-dihydronapth [2,1-d] isoxazolyl-3-ethanoic acid melting at 175°–178°C. were obtained.

EXAMPLE 17

Some 4 g of 4,5-dihydronaphth [2,1-d] isoxazolyl-3-diazoketone were added to a mixed solution of 50 ml of benzene and 50 ml of aqueous ammonia, and 1 g of silver oxide was further added thereto. Then, the mixture was heated for 3 hours. After completion of the reaction, silver oxide was removed by filtration and the filtrate was concentrated under reduced pressure. The resulting oily substance was purified by liquid chromatography and recrystallized from acetone. As a result, 1.1 g of 3-carbamoylmethyl-4,5-dihydronaphth [2,1-d] isoxazole having a melting point of 95°–97°C. were obtained and the product exhibited an absorption at 1635 cm$^{-1}$ due to the carbonyl group of the amide in the infrared absorption spectrum.

When an aqueous solution of ethylamine or an aqueous solution of propylamine was used instead of aqueous ammonia in the above example, the corresponding 3N-ethylcarbamoylmethyl-4,5-dihydronaphth [2,1-d] isoxazole, 3-N-propylcarbamoylmethyl-4,5-dihydronaphth [2,1-d] respectively were obtained. Formation of these compounds was confirmed by absorptions in the vicinity of $\nu_{C=O}^{KBr}$ 1630–1640 cm$^{-1}$ due to the carbonyl group of the amide in the infrared absorption spectrum.

EXAMPLE 18

Some 4.2 g of 3-methoxycarbonylmethyl-8-methoxy-4,5-dihydronaphth [2,1-d] isoxazole were dissolved in 20 ml of tetrahydrofuran, a solution prepared by dissolving 20 cc of 20% aqueous solution of potassium hydroxide in 20 ml of methanol was added thereto. Then, the mixture was heated under reflux on a water bath for 2 hours, and thereafter the solvent was distilled off. In this way, the solid residue of the potassium salt of 8-methoxy-4,5-dihydronaphth [2,1-d] isoxazolyl-3-ethanoic acid was obtained. Then, 50 ml of water were added to the residue and the resulting aqueous solution was washed with benzene. When the water layer was made acidic with 20% hydrochloric acid aqueous solution, crystals were formed. The crystals were collected by filtration and were recrystallized from methanol. As a result, 3.5 g of 8-methoxy-4,5-dihydronaphth [2,1-d] isoxazolyl-3-ethanoic acid melting at 181°–182°C. were obtained as colorless, prism-like crystals. The product exhibited an absorption of KBr 1272 cm$^{-1}$ (C=O) in the infrared absorption spectrum. The elementary analysis values of the acid were as follows:

Calculated: C = 64.86(%), H = 5.05(%), N = 5.40(%).
Measured: C = 64.62(%), H = 5.06(%), N = 5.38(%).

EXAMPLE 19

Some 2 g of 3-N,N-diethylcarbamoylmethyl-7-methoxy-4,5-dihydronaphth [2,1-d] isoxazole were dissolved in 30 ml of tetrahydrofuran, and 20 ml of 10% aqueous solution of hydrochloric acid were added thereto. Then, the solution was heated on a water bath for 3 hours, and the solvent was distilled off under reduced pressure. The residue was made alkaline with 5% aqueous solution of sodium hydroxide and was extracted with ether. Then, the aqueous solution was made acidic again with hydrochloric acid, and the formed crude crystals were collected by filtration and were recrystallized from methanol. As a result, 1.5 g of 7-methoxy-4,5-dihydronaphth [2,1-d] isoxazolyl-3-ethanoic acid having a melting point of 165°–167°C. were obtained.

EXAMPLE 20

Some 6.2 g of 3-methoxycarbonylmethyl-7-methoxy-4,5-dihydronaphth [2,1-d] isoxazole were dissolved in a mixed solution of 50 ml of water, 24 ml of methanol and 4.6 g of caustic soda, and the mixture was heated at 70°C. for 2 hours. After completion of the reaction, the mixture was cooled to room temperature. As a result, a solution of the sodium salt of 7-methoxy-4,5-dihydronaphth [2,1-d] isoxazolyl ethanoic acid was obtained. A half volume of the solution was concentrated under reduced pressure to dryness. When the resulting solid was recrystallized, 2.1 g of white powder were obtained.

The remaining half of the solution was dissolved in water of a volume about 5 times as large as that of the above solution, and when the mixture was made acidic with hydrochloric acid, crystals were formed. Recrystallizing from methanol gave 1.8 g of 7-methoxy-4,5-dihydronaphth [2,1-d] isoxazolyl-3-ethanoic acid in the form of white crystals having a melting point of 165°–166°C. The compound exhibited an absorption of 1725 cm$^{-1}$ due to C=O of the carboxylic acid in the infrared absorption spectrum and UV absorptions at $\lambda_{max}^{EtOH}$ 223 m$\mu$ ($\epsilon$ = 9,970) and 219 m$\mu$ ($\epsilon$=15,700).

EXAMPLE 21

Some 2.43 g of 3-methoxycarbonylmentyl-4,5-dihydronaphth [2,1-d] isoxazole were dissolved in 50 ml of acetic acid, and to this solution a solution of 3 g of anhydrous chromic acid in 10 ml of water was added dropwise at room temperature over a period of time of about 10 minutes. After completion of the addition, the solution was stirred at room temperature for about 2 hours. After completion of the reaction, the solution was thrown into about 300 ml of water, and the formed crystals were collected by filtration and were recrystallized from methanol. As a result, 1.8 g of 3-methoxycarbonylmethylnaphth [2,1-d] isoxazole having a melting point of 155°–157°C. were obtained as yellow needle-like crystals. The results of the examination of the ultra-violet absorption spectrum and of the elementary analysis of the so obtained compound are as follows:

Ultra-violet absorption spectrum:
UV $\lambda_{max}^{EtOH}$
  241 m$\mu$ ($\epsilon$=16,000)
  265 m$\mu$ ($\epsilon$=21,000)
  316 m$\mu$ ($\epsilon$=15,000)
  331 m$\mu$ ($\epsilon$=3,000)
Elementary analysis values:
  Calculated: C = 69.70(%), H = 4.59(%), N = 5.81(%).
  Measured: C = 69.83(%), H = 4.68(%), N = 5.95(%).

EXAMPLE 22

Some 6.87 g of 4,5-dihydronaphth [2,1-d] isoxazolyl-ethanoic acid were dissolved in 200 ml of chloroform. While the solution was being stirred at room temperature, 6.24 g of phosphorus pentachloride were gradually added thereto. In this way, the chlorination was conducted at room temperature. Thereafter, chloroform or phosphoryl chloride was distilled off under reduced pressure, and the residue was dissolved in 200 ml of benzene. To this solution, 7.01 g of N,N-diethylaminoethanol were dissolved in 50 ml of dried benzene, and the resulting solution was added dropwise over a period of about 20 minutes, followed by stirring at room temperature for 2 hours. Then, the solution was heated at 50°–60°C. for 30 minutes. After cooling the solution to room temperature, it was washed twice with 50 ml of water and the organic layer was dried with salt cake. Thereafter, benzene was distilled off and the residue was dissolved in dried ether. Hydrochloric acid gas was blown into the solution to precipitate white crystals. The formed crystals were collected by filtration and recrystallized from ethyl acetate-methanol. As a result, 5.4 g of N,N-diethylaminoethanol ester hydrochloride of 4,5-dihydronaphth [2,1-d] isoxazolyl-3-ethanoic acid having a melting point of 137°–139°C. were obtained as white platelet-like crystals. The compound exhibited absorptions at IR $\nu$KBr 1745 $cm^{-1}$ (C=O) and 2630 $cm^{-1}$ ($NH^+$) in the infrared absorption spectrum. The elementary analysis values of the so obtained compound are as follows:

Calculated: C = 62.54(%), H = 6.91(%), N = 7.68(%).

Measured: C = 62.41(%), H = 6.73(%), N = 7.59(%).

EXAMPLE 23

Some 5.2 g of 7-methoxy-4,5-dihydronaphth [2,1-d] isoxazolyl-3-ethanoic acid were dissolved in 100 ml of chloroform, and 4.16 g of phosphorus pentachloride were gradually added to the solution at room temperature with stirring. Chloroform or phosphoryl chloride was distilled off under reduced pressure. A solution of 4.1 g of N,N-dimethylaminoisopropanol in 50 ml of benzene was added dropwise to the solution over a period of about 20 minutes. Thereafter, the stirring was conducted at room temperature for 2 hours and the solution was heated at 50°–60°C. for 30 minutes. Then, the solution was cooled to room temperature and was washed twice with 50 ml of water. The organic layer was dried with salt cake and then benzene was distilled off. Thus, an oily substance was obtained. The oily substance was dissolved in ether, and hydrochloric acid gas was blown into the solution to precipitate white crystals. The formed crystals were collected and were recrystallized from ethyl acetate-methanol. As a result, 4.5 g of N,N-dimethylaminoisopropanol ester hydrochloride of 7-methoxy-4,5-dihydronaphth [2,1-d] isoxazolyl-3-ethanoic acid melting at 178°–180°C. were obtained as white crystals. The results of the examination of the infrared and ultra-violet absorption spectra and of the elementary analysis of the so obtained compound are as follows:

Infrared absorption spectrum:

IR $\nu_{c=o}^{KBr}$; 1746 $cm^{-1}$ and IR $\nu_{NH+}^{KBr}$; 2610 $cm^{-1}$

Ultra-violet absorption spectrum:

UV $\lambda_{max}^{EtOH}$; 223 m$\mu$ ($\epsilon$=9,241) and 299 m$\mu$ ($\epsilon$=11,063)

Elementary analysis values:

Calculated: C = 60.0(%), H = 6.61(%), N = 7.35(%).

Measured: C = 60.28(%), H = 6.71(%), N = 7.25(%).

EXAMPLE 24

Some 5.2 g of 7-methoxy-4,5-dihydronaphth [2,1D] isoxazolyl-3-ethanoic acid were dissolved in 200 ml of chloroform, and 12.4 g of phosphorus pentachloride were gradually added at room temperature for about 2 hours to effect the chlorination. Thereafter, chloroform and phosphoryl chloride were distilled off under reduced pressure, and the residue was dissolved in 200 ml of benzene. A solution of 3.6 g of N,N-dimethylaminoethanol in 50 ml of benzene was added dropwise to the above solution over a period of time of about 20 minutes, and the resulting solution was stirred for 2 hours at room temperature. Then, the solution was heated at 50°–60°C. for 30 minutes. When the solution was cooled to room temperature, the solution was washed twice with 50 ml of water, and the organic layer was dried with salt cake. Thereafter, benzene was distilled off and the residue was dissolved in ether. Hydrochloric acid gas was blown into the ether solution to precipitate white crystals. The crystals were collected by filtration and were recrystallized from ethyl acetate-methanol. As a result, 4.0 g of N,N-dimethylaminoethanol ester hydrochloride of 6-chloro-7-methoxynaphth [2,1-d] isoxazolyl-3-ethanoic acid having a melting point of 197°–199°C. were obtained as white platelet-like crystals. The compound exhibited absorptions at $\nu_{c=o}^{KBr}$ 1762 $cm^{-1}$ and 2430 $cm^{-1}$ ($NH_4$) in the infrared absorption spectrum. The elementary analysis values of the so obtained compound are as follows:

Calculated: C = 54.16(%), H = 5.05(%), N = 7.02(%).

Measured: C = 54.30(%), H = 5.21(%), N = 7.25(%).

EXAMPLE 25

Some 5.2 g of 7-methoxy-4,5-dihydronaphth [2,1-d] isoxazolyl-3-ethanoic acid were dissolved in 200 ml of chloroform, and 12.4 g of phosphorus pentachloride were added to the solution at room temperature with stirring. Then, the solution was heated at 50°–60°C. for about 2 hours to effect the chlorination. Thereafter, chloroform or phosphoryl chloride was distilled off under reduced pressure, and the residue was dissolved in 200 ml of dried benzene. A solution of 4.1 g of N,N-dimethylaminoisopropanol in 50 ml of benzene was added dropwise to the above solution over a period of time of 20 minutes. Then, the resulting solution was stirred at room temperature for 2 hours and heated at 50°–60°C. for 30 minutes. After cooling the solution to room temperature, the solution was washed twice with 50 ml of water and the organic layer was dried with salt cake. Then, benzene was distilled off and the residue was dissolved in ether. Hydrochloric acid gas was blown into this ether solution to precipitate white crystals. The formed crystals were collected by filtration and were recrystallized from ethyl acetate-ethanol. As a result, 6.4 g of N,N-dimethylaminoisopropanol ester hydrochloride of 6-chloro-7-methoxynaphth [2,1-d] isoxazolyl-3-ethanoic acid having a melting point of 185°–187°C. were obtained as white platelet-like crystals. The results of the examination of the infrared and ultra-violet absorption spectra and of the elementray analysis of the so obtained compound are as follows:

Infrared absorption spectrum:
IR $\nu$KBr cm$^{-1}$:
  1752 (C=O)
  2450 (NH$^+$)
Ultra-violet absorption spectrum:
UV $\lambda_{max}^{EtOH}$:
  229 m$\mu$ ($\epsilon$= 2,900)
  250 m$\mu$ ($\epsilon$= 32,000)
  287 m$\mu$ ($\epsilon$= 9,000)
Elementary analysis values:
  Calculated: C = 55.22(%), H = 5.37(%), N = 6.87(%).
  Measured: C = 55.51(%), H = 5.60(%), N = 6.85(%).

EXAMPLE 26

Some 6.9 g of 7-methoxy-4,5-dihydronaphth [2,1-d] isoxazolyl-3-ethanoic acid were dissolved in 200 ml of chloroform, and the solution was stirred at room temperature. Then, 6.24 g of phosphorus pentachloride were gradually added to the above solution with stirring to effect the chlorination at room temperature. Then, chloroform or phosphoryl chloride was distilled off under reduced pressure, and the residue was dissolved in 200 ml of benzene. Then, 7.12 g of N,N-dimethylaminoethanol dissolved in dried benzene were added dropwise to the above solution. Thereafter, the solution was treated in the same manner as described in Example 22. As a result, 5.1 g of 3-N,N-dimethylaminoethyloxycarbonylmethyl-6-chloro-7-methoxy-naphth [2,1-d] isoxazole hydrochloride having a melting point of 197°–199°C. were obtained as crystals. The compound exhibited absorptions at $_{C=O}{}^{KBr}$ 1762 cm$^{-1}$ and 2430 cm$^{-1}$ (NH$^+$) in the infrared absorption spectrum.

EXAMPLE 27

Some 2.0 g of 8-methoxy-3-methoxycarbonylnaphth [2,1-d] isoxazole were dissolved in 50 ml of anhydrous tetrahydrofuran, and 0.19 g of lithium aluminum hydride powder was added to the solution with stirring. Then, the mixture was heated under reflux for 3 hours. After cooling the solution to room temperature, it was treated with 10% sulfuric acid solution. Then, 50 ml of benzene were added to the reaction mixture for extraction, and after drying over anhydrous sodium sulfate, the solvent was distilled off. The formed crystals were recrystallized from methanol. As a result, 1.5 g of 3-hydroxymethyl-8-methoxynaphth [2,1-d] isoxazole having a melting point of 153°–155°C. were observed as white prism-like crystals. The compound exhibited an absorption at $\nu_{OH}{}^{KBr}$ 3450 cm$^{-1}$ in the infrared absorption spectrum. The elementary analysis values of the so obtained compound are as follows:
  Calculated: C = 68.11(%), H = 4.84(%), N = 6.11(%).
  Measured: C = 67.92(%), H = 4.80(%), N = 5.95(%).

Then, 4.2 g of the 3-hydroxymethyl-8-methoxynaphth [2,1-d] isoxazole obtained in accordance with the above method were dissolved in 50 ml of chloroform, and 17 g of phosphorus pentachloride were added to the solution. The solution was heated under reflux on a water bath for 16 hours. Then, the reaction mixture was poured into ice water, and the formed crystals were collected by filtration, dried and recrystallized from tetrahydrofuran. As a result, 4.0 g of 7-chloro-3-chloromethyl-8-methoxynaphth [2,1-d] isoxazole having a melting point of 214°–217°C. were obtained. The ultra-violet absorption spectrum of the compound was as follows:
$\lambda_{max}^{EtOH}$:
  251 m$\mu$ ($\epsilon$= 21,500)
  298 m$\mu$ ($\epsilon$= 6,500)
  328 m$\mu$ ($\epsilon$= 4,000)
  345 m$\mu$ ($\epsilon$= 4,100)

The so obtained 7-chloro-3-chloromethyl-8-methoxynaphth [2,1-d] isoxazole was treated in the same manner as described in Example 7. As a result, 2.5 g of 7-chloro-8-methoxynaphth [2,1-d] isoxazolyl-3-ethanoic acid having a melting point of 201°–204°C. were obtained, and the products exhibited an absorption at $_{C=O}{}^{KBr}$ 1722 cm$^{-1}$ in the infrared absorption spectrum.

EXAMPLE 28

Some 2.1 g of 3-hydroxymethyl-8-methoxy-4,5-dihydronaphth [2,1-d] isoxazole were dissolved in 50 ml of chloroform, and 17 g of phosphorus pentachloride were added thereto. Then, the solution was heated under reflux on a water bath for 16 hours, and the reaction mixture was poured into ice water. The formed crystals were collected by filtration, dried and recrystallized from tetrahydrofuran. As a result, 2.0 g of 7-chloro-3-chloromethyl-8-methoxynaphth [2,1-d] isoxazole melting at 214°–217°C. were obtained and the product exhibited the following absorptions in the ultra-violet absorption spectrum:
$\lambda_{max}^{EtOH}$:
  251 m$\mu$ ($\epsilon$= 21,500)
  298 m$\mu$ ($\epsilon$= 6,500)
  328 m$\mu$ ($\epsilon$= 4,000)
  345 m$\mu$ ($\epsilon$= 4,100)

Then, 8.02 g of the 7-chloro-3-chloromethyl-8-methoxynaphth [2,1-d] isoxazole prepared in accordance with the above method were dissolved in a mixed solution of equal volumes of water and ethanol together with 5 g of sodium cyanide, and the mixture was treated in the same manner as described in Example 28. As a result, 4.5 g of 7-chloro-8-methoxynaphth [2,1-d] isoxazolyl-3-ethanoic acid having a melting of 203°C. were obtained.

EXAMPLE 29

Some 2 g of 3-hydroxymethyl-7-methoxy-4,5-dihydronaphth [2,1-d] isoxazole were dissolved in 50 ml of carbon tetrachloride, and 15 g of phosphorus pentachloride were further added thereto. Then, the solution was heated under reflux for 16 hours on a water bath. The reaction mixture was poured into ice water, and the formed crystals were collected by filtration, dried and recrystallized from tetrahydrofuran. As a result, 1.9 g of 6-chloro-3-chloromethyl-7-methoxynaphth [2,1-d] isoxazole were obtained.

Then, 1.9 g of the 6-chloro-3-chloromethyl-8-methoxynaphth [2,1-d] isoxazole prepared in accordance with the above method were dissolved in a mixed solution of equal volumes of water and methanol together with 1.5 g of sodium cyanide, and the mixture was treated in the same manner as described in Example 5. As a result, 1.1 g of 3-hydroxymethyl-6-chloro-7- methoxynaphth [2,1-d] isoxazole melting at 179°–181°C. were obtained, and the product exhibited an absorption at $\nu_{C=O}^{KBr}$ 1718 cm$^{-1}$ in the infrared absorption spectrum.

EXAMPLE 30

Some 4.95 g of 3-chloromethyl-8-methoxy-4,5-dihydronaphth [2,1-d] isoxazole and 10 g of chloranil were heated under reflux for 15 hours in 100 ml of xylene. After completion of the reaction, the solution was washed with 10% aqueous ammonia and then with water, and was dried over salt cake. Then, the solvent was distilled off and the residue was recrystallized from methanol. As a result, 2.75 g of 3-chloromethyl-7-methoxynaphth [2,1-d] isoxazole having a melting point of 132°–134°C. were obtained as white needle-like crystals and the product exhibited the following absorptions in the ultra-violet absorption spectrum:

UV $\lambda_{max}^{EtOH}$:
228 m$\mu$ ($\epsilon$= 17,000)
250 m$\mu$ ($\epsilon$= 22,000)
288 m$\mu$ ($\epsilon$= 14,000)
336 m$\mu$ ($\epsilon$= 2,000)

The elementary analysis values of the above compound are as follows:

Calculated: C = 63.04(%), H = 4.07(%), N = 5.66(%).

Measured: C = 62.98(%), H = 4.21(%), N = 5.69(%).

Then, 2.5 g of the 3-chloromethyl-8-methoxynaphth [2,1-d] isoxazole obtained by the above method and 1.7 g of sodium cyanide were dissolved in a mixed solution of water and ethanol, and the solution was treated in the same manner as described in Example 5. As a result, 1.2 g of 7-methoxynaphth [2,1-d] isoxazolyl-3-ethanoic acid having a melting point of 189°–191°C. were obtained and the product exhibited an absorption at $\nu_{C=O}^{KBr}$ 1720 cm$^{-1}$ in the infrared absorption spectrum.

EXAMPLE 31

Some 2.5 g of 3-chloromethyl-8-methoxy-4,5-dihydronaphth [2,1-d] isoxazole were dissolved in 50 ml of chloroform, and 4.5 g of phosphorus pentachloride were added thereto. Then, the solution was heated under reflux for 3 hours at the temperature corresponding to the boiling point of chloroform. After completion of the reaction, the reacted mixture was poured into ice water, the chloroform layer was separated, and the chloroform was distilled off according to a customary method. The resulting crude crystals were recrystallized from a mixed solvent of chloroform and methanol. As a result, 1.8 g of 6-chloro-3-chloromethyl-8-methoxynaphth [2,1-d] isoxazole melting at 212°–214°C. were observed as colorless needle-like crystals and the product exhibited the following absorptions in the ultra-violet absorption spectrum:

$\lambda_{max}^{EtOH}$:
230 m$\mu$ ($\epsilon$= 25,000)
252 m$\mu$ ($\epsilon$= 39,000)
292 m$\mu$ ($\epsilon$= 16,500)
344 m$\mu$ ($\epsilon$= 3,900)

Then, 4.5 g of the 6-chloro-3-chloromethyl-7-methoxynaphth [2,1-d] isoxazole obtained by the above method and 2.0 g of potassium cyanide were dissolved in a mixed solution of equal volumes of water and ethanol, and the mixture was treated in the same manner as described in Example 5. As a result, 3.1 g of 6-chloro-3-hydroxycarbonylmethyl-8-methoxynaphth [2,1-d] isoxazole having a melting point of 179°–181°C. were obtained and the product exhibited an absorption at $\nu_{C=O}^{KBr}$ 1718 cm$^{-1}$ in the infrared absorption spectrum.

EXAMPLE 32

Some 4 g of 3-methoxycarbonylnaphth [2,1-d] isoxazole were dissolved in 50 ml of anhydrous tetrahydrofuran, and the solution was treated in the same manner as described in the method for preparing the starting compound of Example 1. In this way, 3 g of 3-hydroxymethylnaphth [2,1-d] isoxazole having a melting point of 145°–146°C. were obtained.

Then, 5 g of the 3-hydroxymethylnaphth [2,1-d] isoxazole obtained by the above method were dissolved in 50 ml of chloroform, and the solution was subjected to bromination in the same manner as described in Example 3. As a result, 4.7 g of 3-bromomethylnaphth [2,1-d] isoxazole melting at 187°–188°C. were obtained.

Then, 4 g of the 3-bromomethylnaphth [2,1-d] isoxazole were treated in the same manner as described in Example 4. In this way, 3 g of naphth [2,1-d] isoxazolyl-3-ethanoic acid having a melting point of 182°–185°C. were obtained and the product exhibited an absorption at $\nu_{C=O}^{KBr}$ 1725 cm$^{-1}$ in the infrared absorption spectrum.

EXAMPLE 33

Some 5.7 g of 4,5-dihydronaphth [2,1-d] isoxazolyl-3-ethanoic acid were dissolved in 100 ml of chloroform, and 6.24 g of phosphorus pentachloride were added gradually thereto. Then, the solution was heated at 40°–50°C. for 2 hours. After completion of the reaction, chloroform and phosphoryl chloride were distilled off, the residue was dissolved in 200 ml of dried benzene, and the solution was stirred at room temperature. Then, 4.4 g of N,N-dimethylaminoethylamine dissolved in 50 ml of benzene were gradually added dropwise to the above solution. Then, the solution was stirred at room temperature for 3 hours, and was heated at 50°–60°C. for 30 minutes. After the reaction mixture had been cooled to room temperature, it was washed twice with 50 ml of water, and the organic layer was dried over salt cake. Then, benzene was distilled off. The residue was dissolved in ether, and hydrochloric acid gas was blown into the ether solution to precipitate white crystals. Then, the crystals were collected by filtration and recrystallized from a mixed solution of ethyl acetate and methanol. As a result, 3.2 g of hydrochloride of 3-N,N-dimethylaminoethylcarbamoylmethyl-4,5-dihydronaphth [2,1-d] isoxazole having a melting point of 245°–248°C. were obtained as white needle-like crystals and the product exhibited absorptions at $\nu_{max}^{KBr}$: 2660 cm$^{-1}$ (NH$^+$) and 1640 cm$^{-1}$ (C=O).

EXAMPLE 34

Some 1.15 g of 4,5-dihydronaphth [2,1-d] isoxazolyl-3-ethanoic acid prepared by a method as described in Example 16 were dissolved in 30 ml of acetone, and the solution was agitated at room temperature. A solution of 0.37 g of diethylamine in 10 ml of acetone was gradually added to the above solution, and the mixture was allowed to stand at room temperature for 20 minutes. Then, acetone was distilled off and the residue was recrystallized from ether to obtain 1.05 g of 4,5-dihydronaphth [2,1-d] isoxazolyl-3-ethanoic acid diethylamine salt in the form of white needle-like crystals melting at 79.1°–80.6°C. The infrared absorption spectrum of the resulting compound is as follows:

IR $\nu_{max}^{KBr}$ (cm$^{-1}$): 1632, 1388 (—COO$^-$)

EXAMPLE 35

Some 1.15 g of 4,5-dihydronaphth [2,1-d] isoxazolyl-3-ethanoic acid prepared by the method described in Example 16 was dissolved in 30 ml of acetone, and the solution was agitated at room temperature. A solution of 0.44 g of morpholine in 10 ml of acetone was added to the above solution being agitated, and the mixture was allowed to stand for 10 minutes. Then, 10 ml of ether were added to the mixture to obtain 1.12 g of 4,5-dihyronaphth [2,1-d] isoxazolyl-3-ethanoic acid morpholine salt in the form of white needle-like crystals melting at 102.5°–103.8°C. The infrared absorption spectrum of the product is as follows:

IR $\nu_{max}^{KBr}$ (cm$^{-1}$): 1585, 1382 (—COO$^-$)

EXAMPLE 36

Some 2.29 g of 4,5-dihydronaphth [2,1-d] isoxazolyl-3-ethanoic acid prepared by the method described in Example 16 were dissolved in 20 ml of tetrahydrofuran, and a solution of 1.74 g of L-arginine in 15 ml of water was added to the above solution at room temperature. The mixture was agitated at room temperature for 2 hours. The reaction solvent was distilled off under reduced pressure to obtain a faintly yellow, glutinous substance, which was soluble in water and characterized by IR $\nu_{max}^{KBr}$ (cm$^{-1}$): 1635, 1371 (—COO$^-$). When this glutinous product was recrystallized from methanol and ethyl acetate, 2.2 g of 4,5-dihydronaphth [2,1-d] isoxazolyl-3-ethanoic acid L-arginine salt in the form of white powder were obtained.

EXAMPLE 37

Some 2.2 g of 4,5-dihydronaphth [2,1-d] isoxazolyl-3-ethanoic acid were dissolved in 20 ml of tetrahydrofuran, and when 5 ml of a 10% aqueous solution of NaOH were added to the above solution, a salt was immediately precipitated. The precipitate was recovered by filtration, and dissolved in water. Tetrahydrofuran was added dropwise to the aqueous solution to obtain 2.0 g of sodium 4,5-dihydronaphth [2,1-d] isoxazolyl-3-ethanoate in the form of colorless needle-like crystals melting above 300°C. The product was characterized by IR (KBr) of 1600 cm$^{-1}$ (brood) (—COO$^-$).

EXAMPLE 38

Some 2.2 g of 4,5-dihydronaphth [2,1-d] isoxazolyl-3-ethanoic acid were dissolved in 20 ml of tetrahydrofuran, and 3 ml of a 28% aqueous solution of NH$_3$ were added to the solution to precipitate a salt. The precipitate was recovered by filtration and recrystallized from methanol to obtain 2.2 g of ammonium 4,5-dihydronaphth [2,1-d] isoxazolyl-3-ethanoate in the form of colorless needle-like crystals characterized by IR (KBr) of 1604 cm$^{-1}$.

EXAMPLE 39

Some 2.2 g of 4,5-dihydronaphth [2,1-d] isoxazolyl-3-ethanoic acid were dissolved in 20 ml of tetrahydrofuran, and 2 ml of a 70% aqueous solution of ethyl amine were added to the above solution. The solvent was distilled off under reduced pressure, and the residue was recrystallized from ethanol and ether to obtain 2.3 g of 4,5-dihydronaphth [2,1-d] isoxazolyl-3-ethanoic acid ethyl ammonium salt in the form of colorless needle-like crystals characterized by IR (KBr) of 1610 cm$^{-1}$.

EXAMPLE 40

Sodium carbonate was added to an aqueous solution of aluminum sulfate, and the resulting precipitate of aluminum hydroxide was incorporated with an ethyl alcohol solution of 4 g of 4,5-dihydronaphth [2,1-d] isoxazolyl-3-ethanoic acid. The mixture was heated on a water bath. The precipitate was recovered, washed with water and alcohol, and air-dried to yield 3.5 g of monohydroxyaluminum di-(4,5-dihydronaphth [2,1-d] isoxazolyl-3-ethanoate) in the form of colorless powder characterized by IR $\nu_{COO}^{KBr}$ cm$^{-1}$ of 1660 and 1440.

EXAMPLE 41

Some 22.9 g of 4,5-dihydronaphth [2,1-d] isoxazolyl-3-ethanoic acid were dissolved in 400 ml of water containing 3.9 g of caustic soda, and the pH of the solution was adjusted to 8.5. The solution was gradually incorporated with a solution of 7.95 g of aluminum chloride (AlCl$_3$.6H$_2$O) in 100 ml of water at room temperature, to precipitate a white aluminum salt. The precipitate was recovered by filtration, dried and recrystallized from a mixed solvent of chloroform and methanol to yield 18.0 g of aluminum tri-(4,5-dihydronaphth [2,1-d] isoxazolyl-3-ethanoate) melting at 248°–250°C. and characterized by IR $\nu_{max}^{KBr}$ (cm$^{-1}$) of 1600 and 1440 (COO—). The aluminum content of the product was found to be 3.85% (the theoretical value being 3.79%).

EXAMPLE 42

Some 2.29 g of 4,5-dihydronaphth [2,1-d] isoxazolyl-3-ethanoic acid was dissolved in 30 ml of acetone, and it was blended with a solution of 0.99 g of cyclohexyl amine in 10 ml of acetone at room temperature, following which the mixture was allowed to stand still. Precipitated needle-like crystals were recovered by filtration, and recrystallized from acetone to yield 2.75 of 4,5-dihydronaphth [2,1-d] isoxazolyl-3-ethanoic acid cyclohexyl amine salt melting at 134°–137°C. and characterized by IR $\nu_{max}^{KBr}$ (cm$^{-1}$) of 1585 and 1392 (carboxylate). Results of the elementary analysis of the product are as follows:

Calculated: C = 69.49%, H = 7.37%, N = 8.53%.
Found: C = 69.52%, H = 7.51%, N = 8.27%.

EXAMPLE 43

Some 1.28 g of 7-methoxynaphth [2,1-d] isoxazolyl-3-ethanoic acid were dissolved in 20 ml of acetone, a solution of 0.43 g of piperidine in 10 ml of acetone was added to the solution at room temperature. The mixture was allowed to stand for 20 minutes. The precipitated needle-like crystals were recovered by filtration and recrystallized from acetone and ether to yield 1.25 g of 7-methoxynaphth [2,1-d] isoxazolyl- 3-ethanoic acid piperidine salt melting at 154°–156°C. and characterized by IR $\nu_{max}^{KBr}$ (cm$^{-1}$) of 1600 and 1372 (—COO—). Results of the elementary analysis of the product are as follows:

Calculated: C = 66.65%, H = 6.48%, N = 8.18%.
Found: C = 66.72%, H = 6.35%, N = 8.21%.

EXAMPLE 44

Some 2.72 g of naphth [2,1-d] isoxazolyl-3-ethanoic acid were dissolved in 30 ml of acetone, and the solution was added at room temperature to a solution of 0.91 g of di-n-propyl amine in 10 ml of acetone. The mixture was allowed to stand to precipitate flake-like crystals. The precipitated crystals were recovered by filtration and recrystallized from acetone to yield 2.52 g of naphth [2,1-d] isoxazolyl-3-ethanoic acid di-n-propyl amine salt melting at 119°–122°C. and characterized by IR $\nu_{max}^{KBr}$ (cm$^{-1}$) of 1630 and 1378 (—COO$^-$). Results of the elementary analysis of the product are as follows:

Calculated: C = 69.49%, H = 7.37%, N = 8.53%.
Found: C = 69.25%, H = 7.51%, N = 8.62%.

EXAMPLE 45

Some 2.29 g of 4,5-dihydronaphth [2,1-d] isoxazolyl-3-ethanoic acid were dissolved in 30 ml of acetone, and the solution was added at room temperature to a solution of 2.36 g of p-aminobenzoyl diethyl amino ethanol in 20 ml of acetone. The mixture was allowed to stand for 30 minutes, and acetone was distilled off. The residue was recrystallized from acetone and ether to yield 3.52 g of 4,5-dihydronaphth [2,1-d] isoxazolyl-3-ethanoic acid p-aminobenzoyl diethyl amino ethanol salt melting at 146°–148°C. and characterized by IR $\nu_{max}^{KBr}$ (cm$^{-1}$) of 1582 and 1381 (—COO—).

What is claimed is:

1. A compound expressed by the formula:

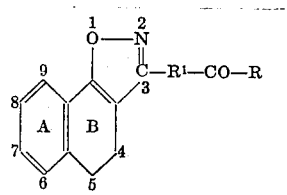

where ring A may be substitued with 1- 2 substituents selected from the group consisting of alkoxy of up to 4 carbon atoms, alkyl of up to 4 carbon atoms, and halogen; ring B may have a carbon-to-carbon double bond between the positions of C-4 and C-5; R$^1$ represents methylene, and R is selected from hydroxyl, —O(M)$_{1/m}$ wherein M is a metal selected from the group consisting of alkali metals, alkaline earth metals and aluminum having a valence of 1, 2, or 3, ammonium or HZ wherein Z is a pharmaceutically acceptable, non toxic organic amine, and $m$ is the valence of M, alkoxy of up to 4 carbon atoms, amino, aminoalkoxy in which alkoxy has up to 4 carbon atoms, and aminoalkyl amino in which alkyl has up to 2 carbon atoms.

2. The compound of claim 1 of the formula

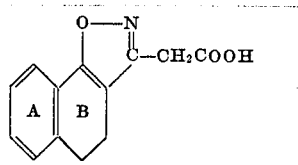

wherein ring A may be substituted with 1-2 substituents selected from the group consisting of alkoxy of up to 4 carbon atoms, alkyl of up to 4 carbon atoms and halogen, ring B may have a carbon-to-carbon double bond between the positions of C-4 and C-5.

3. The compound of claim 1 of the formula

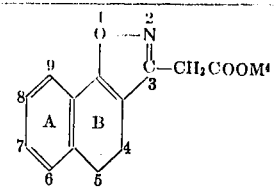

wherein A and B are as defined in claim 1, and M$^4$ is sodium or potassium.

4. The compound of claim 2 of the formula

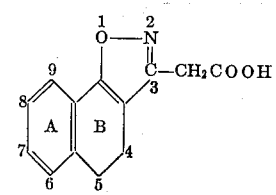

wherein at least one of the positions of C-7 and C-8 of ring A is substituted with methoxy, and ring B may have a carbon-to-carbon double bond between the positions C-4 and C-5.

5. The compound of claim 2 wherein said compound is 4,5-dihydronaphth [2,1-d] isoxazolyl-3-ethanoic acid.

6. The compound of claim 2 wherein said compound is naphth isoxazolyl-3-ethanoic acid.

7. A compound of the formula

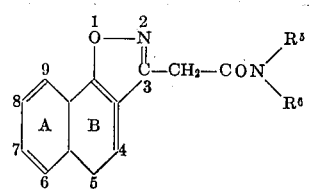

wherein ring A may be substituted with 1–2 substituents selected from the group consisting of alkoxy of up to 4 carbon atoms, alkyl of up to 4 carbon atoms, and halogen, ring B may have a carbon-to-carbon double bond between the positions of C-4 and C-5, and R$^5$ and R$^6$ each represent alkyl of up to 4 carbon atoms, or R$^5$ and R$^6$ may be bonded together directly or through a nitrogen or oxygen atom to form, together with the nitrogen atom, pyrrolidino, piperidino, N-alkylpiperazino in which alkyl has up to 2 carbon atoms or morpholino.

8. The compound of claim 7 wherein said compound is 3-N,N-diethylcarbamoyl-methyl-7-methoxy-4,5-dihydronaphth [2,1-d]isoxazole.

9. The compound of claim 1 wherein said compound is 3-carbamoylmethyl-4,5-dihydronaphth [2,1-d] isoxazole.

10. The compound of claim 7 wherein said compound is 3-N,N-dipropylcarbamoylmethyl-7-methoxy-4,5-dihydronaphth [2,1-d] isoxazole.

11. A compound of the formula

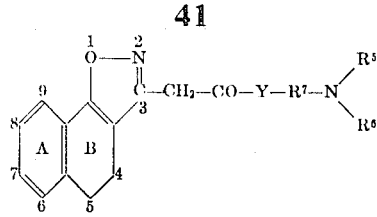

wherein ring A may be substituted with 1–2 substituents selected from the group consisting of alkoxy of up to 4 carbon atoms, alkyl of up to 4 carbon atoms, and halogen, ring B may have a carbon-to-carbon double bond between the positions of C-4 and C-5, $R^5$ and $R^6$ each represent alkyl of up to 4 carbon atoms, or $R^5$ and $R^6$ may be bonded together directly or through a nitrogen or oxygen atom to form, together with the nitrogen atom, pyrrolidino, piperidino, N-alkylpiperazino in which alkyl has up to 2 carbon atoms or morpholino, $R^7$ represents alkylene of up to 4 carbon atoms, and Y is an oxygen atom or

12. The compound of claim 11 wherein said compound is 3-N,N-dimethylaminoethyl-oxycarbonylmethyl-7-methoxy-4,5-dihydronaphth [2,1-d] isoxazole.

13. The compound of claim 11 wherein said compound is 3, N,N-diethylaminoethyl-oxycarbonylmethyl-7-methoxy-4,5-dihydronaphth [2,1-d] isoxazole.

14. A salt of 4,5-dihydronaphth isoxazole-3-ethanoic acid with a metal selected from the group consisting of sodium, potassium, magnesium, calcium and aluminum.

15. A salt of naphth isoxazolyl-3-ethanoic acid with a metal selected from the group consisting of sodium, potassium, magnesium, calcium and aluminum.

* * * * *